US011727308B2

(12) United States Patent
Minoya

(10) Patent No.: US 11,727,308 B2
(45) Date of Patent: Aug. 15, 2023

(54) LEARNING SYSTEM AND METHOD

(71) Applicant: DENSO CORPORATION, Kariya (JP)

(72) Inventor: Kenichi Minoya, Kariya (JP)

(73) Assignee: DENSO CORPORATION, Kariya (JP)

(*) Notice: Subject to any disclaimer, the term of this patent is extended or adjusted under 35 U.S.C. 154(b) by 321 days.

(21) Appl. No.: 17/003,276

(22) Filed: Aug. 26, 2020

(65) Prior Publication Data

US 2021/0065060 A1    Mar. 4, 2021

(30) Foreign Application Priority Data

Aug. 26, 2019    (JP) ................. 2019-153723

(51) Int. Cl.
*G06N 20/00*    (2019.01)
*G06N 3/08*    (2023.01)
*G06N 3/088*    (2023.01)

(52) U.S. Cl.
CPC ............. *G06N 20/00* (2019.01); *G06N 3/088* (2013.01)

(58) Field of Classification Search
CPC ...... G06N 20/00; G06N 3/006; G06N 3/0454; G06N 3/088
See application file for complete search history.

(56) References Cited

U.S. PATENT DOCUMENTS

| | | | |
|---|---|---|---|
| 2009/0248175 A1 | 10/2009 | Eguchi et al. | |
| 2010/0211244 A1 | 8/2010 | Jeong et al. | |
| 2016/0288323 A1 | 10/2016 | Mühlig et al. | |
| 2017/0170097 A1 | 6/2017 | Makino et al. | |
| 2018/0307211 A1 | 10/2018 | Aizawa et al. | |

FOREIGN PATENT DOCUMENTS

| | | |
|---|---|---|
| JP | 2007-316799 A | 12/2007 |
| JP | 2010-092279 A | 4/2010 |
| JP | 2010-191502 A | 9/2010 |
| JP | 2015-152991 A | 8/2015 |
| JP | 2017-010292 A | 1/2017 |
| WO | 2019021401 A1 | 1/2019 |

OTHER PUBLICATIONS

Lee et al. ("A Coarse-to-Fine Approach for Fast Path Finding for Mobile Robots", 2009 IEEE/RSJ International Conference on Intelligent Robots and Systems, 2009, pp. 5414-5419) (Year: 2009).*

(Continued)

*Primary Examiner* — Miranda M Huang
*Assistant Examiner* — Robert Lewis Kulp
(74) *Attorney, Agent, or Firm* — Maschoff Brennan

(57) ABSTRACT

A learning method explores, in a block space, a global path from a sub initial point to a sub goal candidate region for movement of an agent, and limits, based on the global path, an exploring space to thereby determine a limited space in the exploring space. The method arranges a sub goal in the limited space in accordance with a position of a goal point, and transforms absolute coordinates of each of at least one obstacle and a sub goal in the limited space into corresponding relative coordinates relative to a position of an agent located in the limited space. Then, the method explores, in the limited space, a target path from the initial point to the sub goal.

10 Claims, 25 Drawing Sheets

(56) References Cited

OTHER PUBLICATIONS

Kuo et al. ("Deep sequential models for sampling-based planning", https://arxiv.org/abs/1810.00804, arXiv:1810.00804v1 [cs.RO] Oct. 1, 2018, pp. 1-8) (Year: 2018).*
Florensa et al. ("Reverse Curriculum Generation for Reinforcement Learning", https://arxiv.org/abs/1707.05300, arXiv:1707.05300v3 [cs.AI] Jul. 23, 2018, pp. 1-14) (Year: 2019).*
Bai et al. ("Multi-Density Clustering Based Hierarchical Path Planning", 2019 2nd International Conference on Artificial Intelligence and Big Data, May 2019, pp. 176-182) (Year: 2019).*
Sertack Karaman (Sampling-based Algorithms for Optimal Path Planning Problems, PhD Thesis, MIT, Sep. 2012, pp. 1-152) (Year: 2012).*
Zuo et al. ("A Hierarchical path planning approach based on A* and least-squares policy iteration for mobile robots", Neurocomputing 170, 2016, pp. 257-266) (Year: 2016).*
Alexander Sasha Vezhnevets et al.,"FeUdal Networks for Hierarchical Reinforcement Learning", arXiv:1703.01161v2, Mar. 6, 2017, 12 pgs.
Aviv Tamar et al., "Value Iteration Networks", 30th Conference on Neural Information Processing Systems, NIPS 2016, 9 pgs.
Ahmed H. Qureshi et al., "Motion Planning Networks", arXiv:1806.05767v2, Feb. 24, 2019, 7 pgs.

* cited by examiner

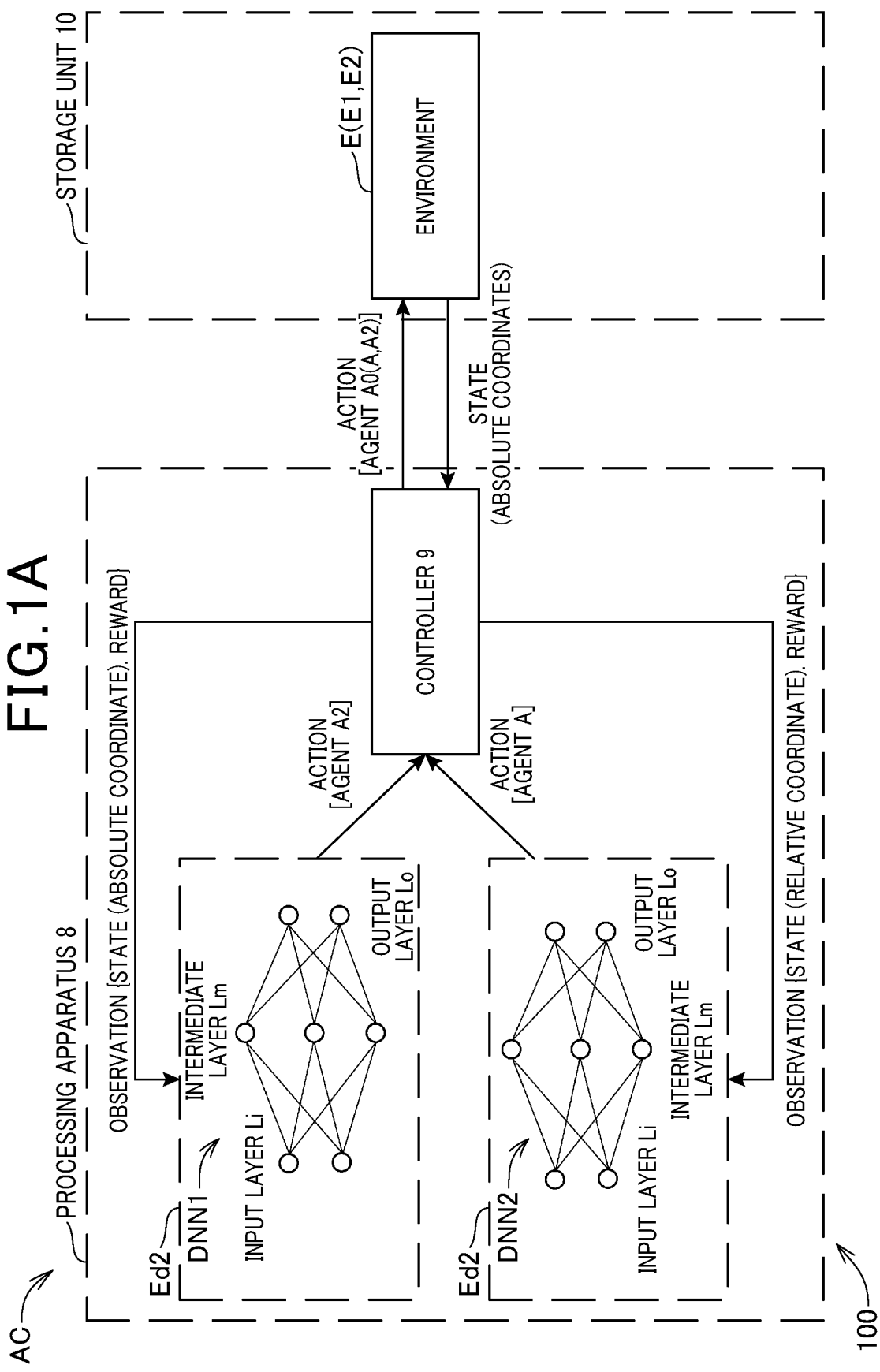

FIG.6
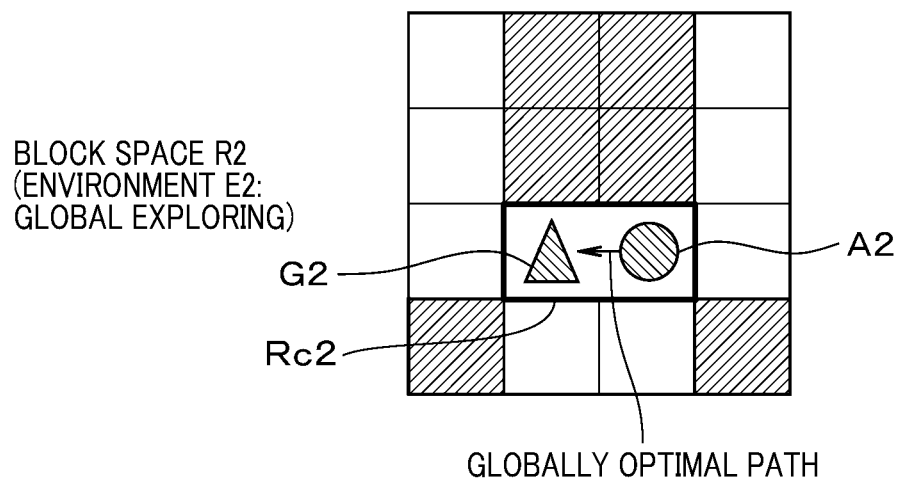
BLOCK SPACE R2
(ENVIRONMENT E2:
GLOBAL EXPLORING)
G2
Rc2
A2
GLOBALLY OPTIMAL PATH
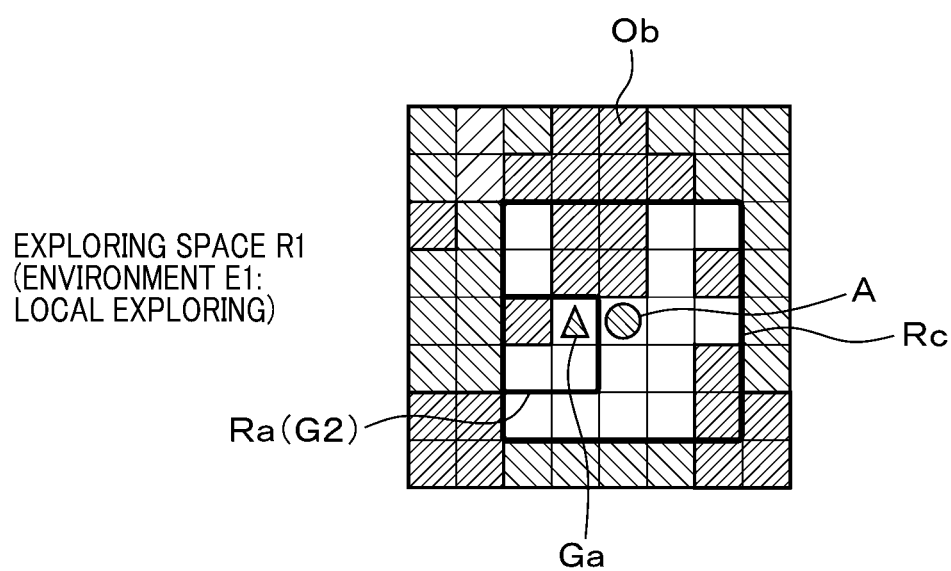
EXPLORING SPACE R1
(ENVIRONMENT E1:
LOCAL EXPLORING)
Ob
A
Rc
Ra(G2)
Ga

FIG.20
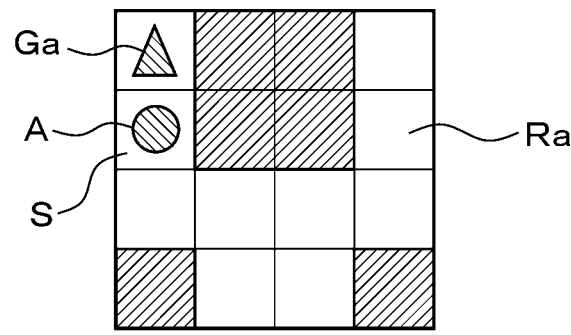
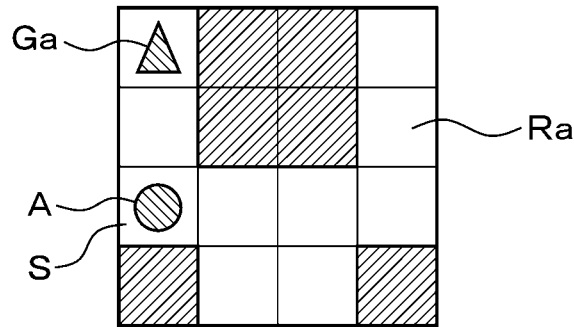
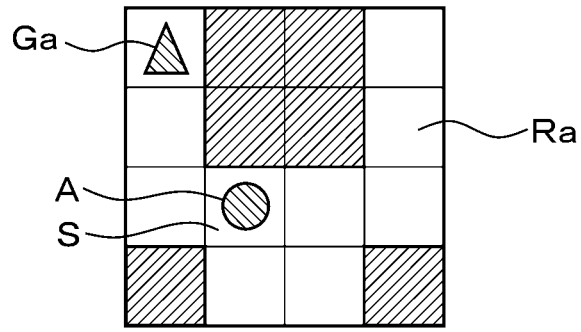
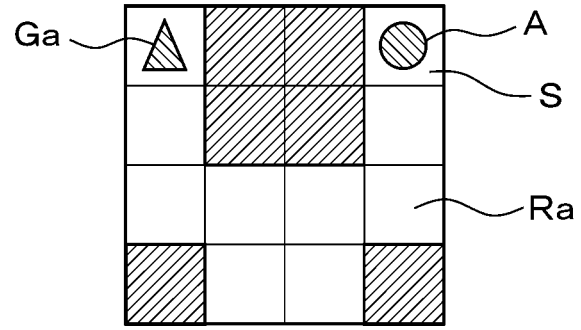

FIG.21
BLOCK SPACE R2
(ENVIRONMENT E2:
GLOBAL EXPLORING)
FIRST TRIAL
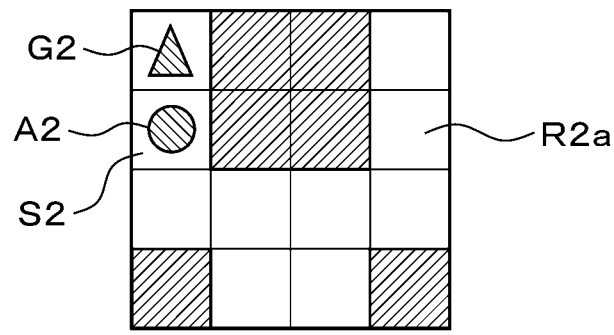
SECOND TRIAL
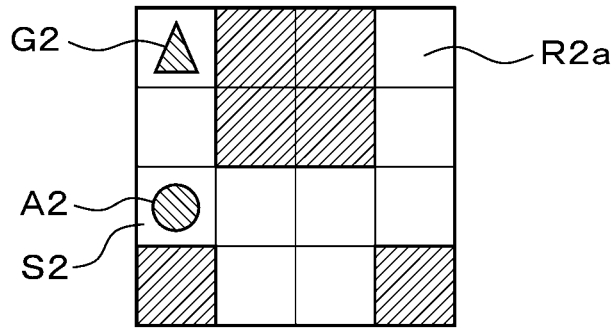
THIRD TRIAL
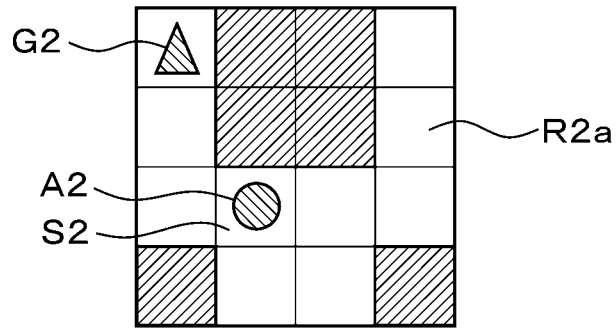
N-TH TRIAL
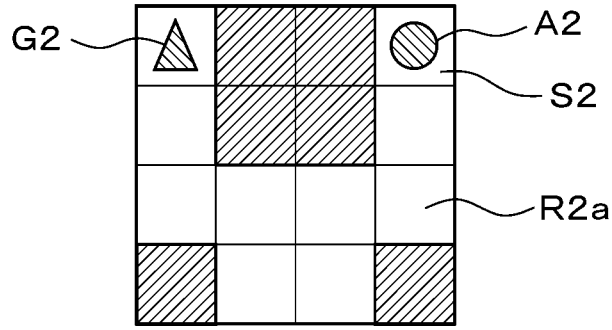

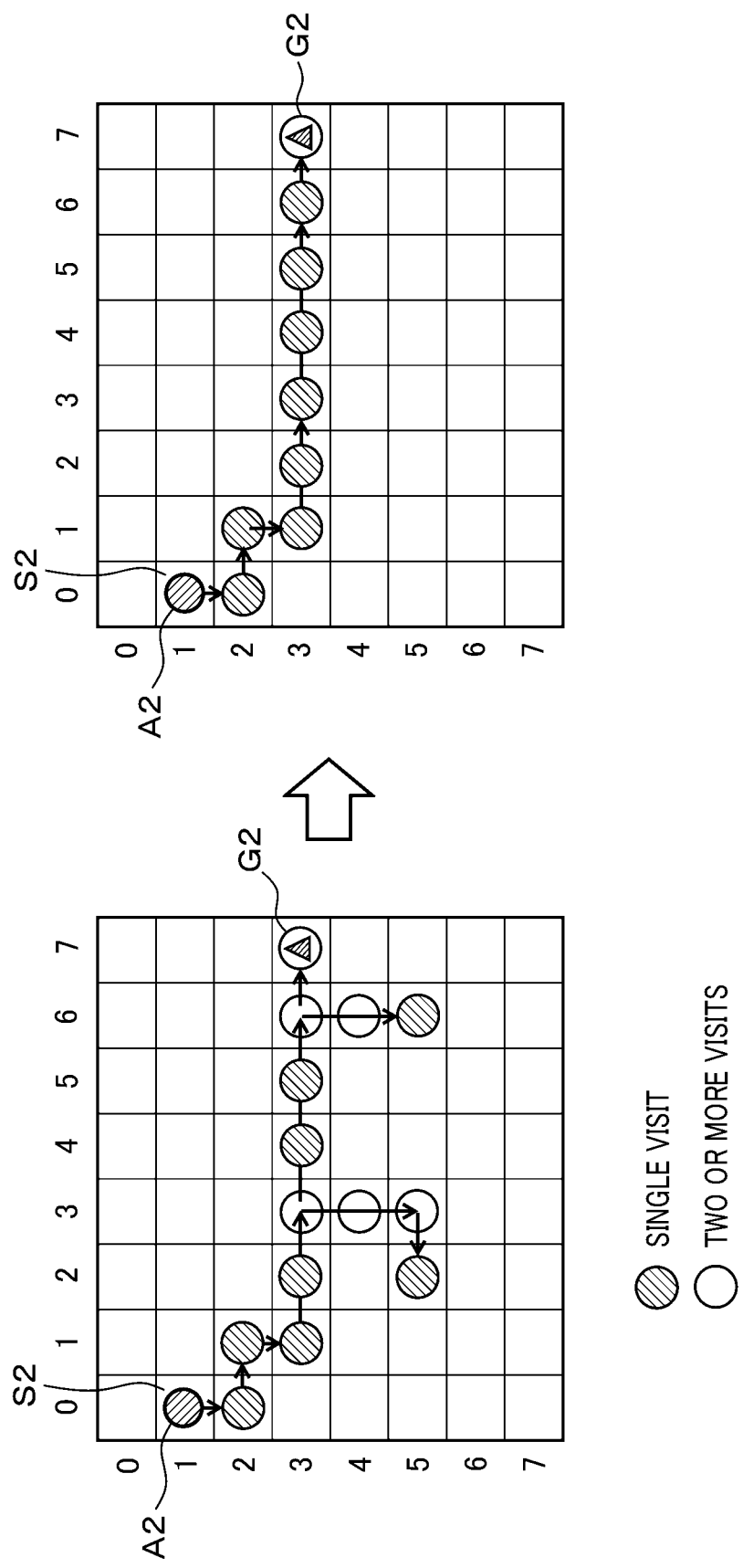

LEARNING SYSTEM AND METHOD

CROSS REFERENCE TO RELATED APPLICATION

This application is based on and claims the benefit of priority from Japanese Patent Application No. 2019-153723 filed on Aug. 26, 2019, the disclosure of which is incorporated in its entirety herein by reference.

TECHNICAL FIELD

The present disclosure relates to learning systems and methods.

BACKGROUND

Various approaches, i.e. algorithms, of autonomously controlling motion trajectories of a robot have been proposed in recent years. These algorithms are generally categorized into sampling-based algorithms and learning-based algorithms.

SUMMARY

A learning method explores, in a block space, a global path from a sub initial point to a sub goal candidate region for movement of an agent, and limits, based on the global path, an exploring space to thereby determine a limited space in the exploring space. The method arranges a sub goal in the limited space in accordance with a position of a goal point, and transforms absolute coordinates of each of at least one obstacle and a sub goal in the limited space into corresponding relative coordinates relative to a position of an agent located in the limited space. Then, the method explores, in the limited space, a target path from the initial point to the sub goal.

BRIEF DESCRIPTION OF THE DRAWINGS

Other aspects of the present disclosure will become apparent from the following description of embodiments with reference to the accompanying drawings in which:

FIG. 1A is a block diagram schematically illustrating an example of the schematic structure of a path exploring system, when operating in a learning mode, according to the first embodiment of the present disclosure;

FIG. 6 is a diagram schematically illustrating a first example of an exploring space limiting task;

FIG. 20 is a diagram schematically illustrating an initial arrangement changing task in the local exploring task;

FIG. 21 is a diagram schematically illustrating the initial arrangement changing task in the global exploring task;

FIG. 25 is a diagram schematically illustrating a second example of the eliminating task.

DETAILED DESCRIPTION OF EMBODIMENTS

Viewpoint

Figure 1B:
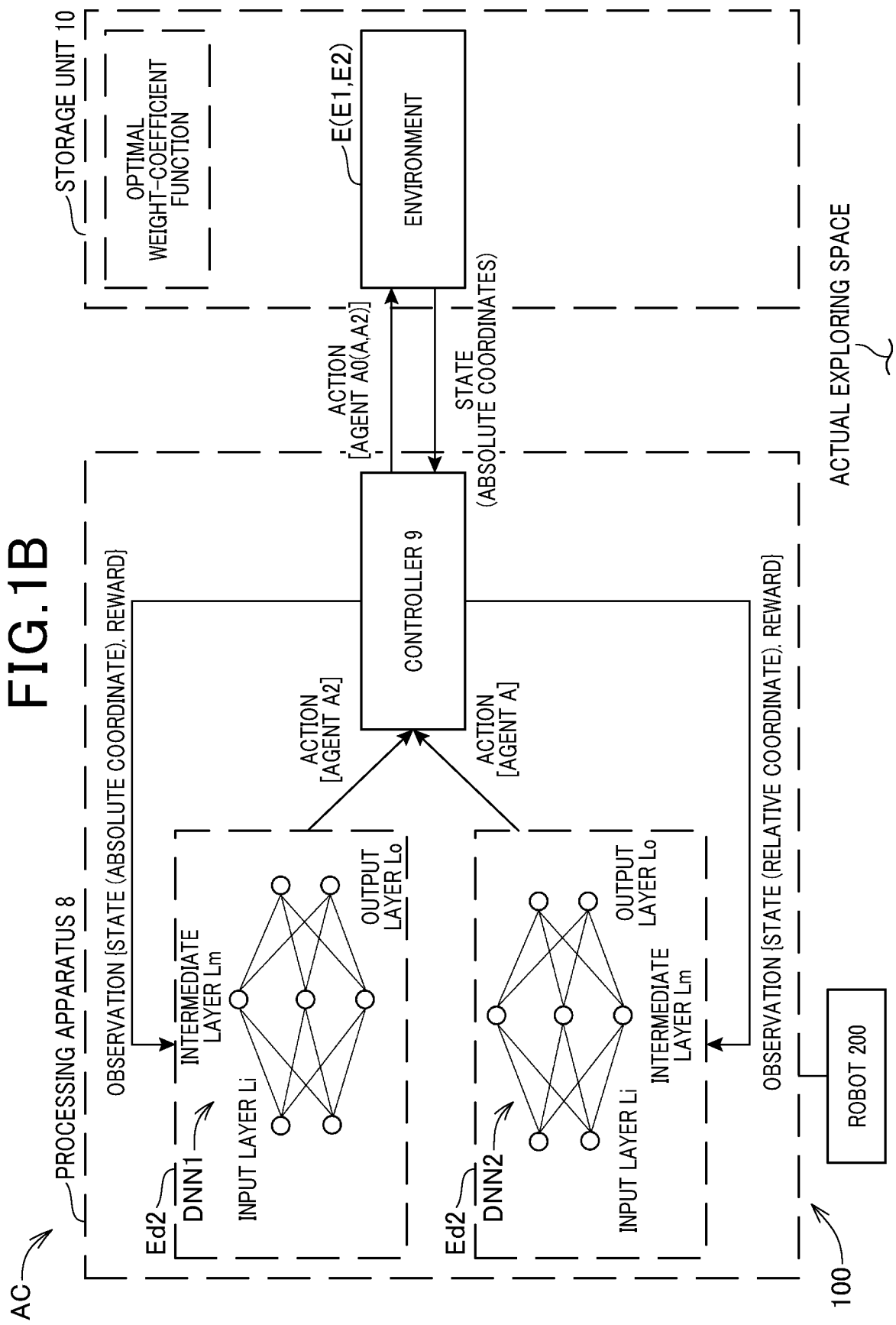
FIG. 1B is a block diagram schematically illustrating an example of the schematic structure of the path exploring system, when operating in an execution mode, according to the first embodiment of the present disclosure.

The above sampling-based or planning-based algorithms perform real-time exploring of a path between a start point (start node) and a goal point (goal node) in an exploring space or a state space when executed. These sampling-based algorithms include a Rapidly-exploring Random Tree (RRT) algorithm.

Such an RRT algorithm is roughly designed to perform (i) A step of randomly sampling a point, i.e. a node, in the exploring space (ii) A step of checking whether the sampled node collides with obstacles in the exploring space (iii) A step of checking, upon determination that the sampled node has no collisions with the obstacles, whether a straight current path, i.e. a straight current link, between the sampled node and the nearest existing node in the tree has any collisions with the obstacles; in the first time sampling, the nearest existing node is the start node (iv) A step of adding, upon determination that the current path has no collisions, the sampled point and the current path to the tree with the nearest point as its parent node (v) A step of throwing out, upon determination that there is a collision between the current path and an obstacle, the sampled point, returning to the step (i)

(vi) A step of checking, each time after a node is added to the tree, whether the added node is less than a threshold distance from the goal node (vii) A step of checking, upon determination that the added node is less than the threshold distance from the goal node, whether the goal node is reachable in a straight path from the added node (viii) A step of adding, upon determination that the goal node is reachable, the goal node to the tree with the most recently added node as its parent node, thus being completed (ix) A step of repeating, if the goal node is unreachable, the steps (i) to (viii) until a result of the determination in the step (vii) is reachable Such a sampling-based algorithm may determine undulation paths upon an execution environment in the exploring space being complicated, making it difficult to determine an optimal path from the start node to the goal node.

From this viewpoint, implemented sampling-based algorithms, which emphasize optimality of a path, such as RRT* (RRT star) algorithms, have been proposed. Such an RRT* algorithm is, for example, different from the RRT algorithm in the following point.

Specifically, the step (iv) in the RRT* algorithm is modified to include (iv1) A step of determining whether one or more paths from the added node to selected nodes in the tree, which are closer to the added node, are shorter than the current straight path (iv2) A step of obtaining the one or more paths upon determination that the one or more paths are shorter than the current path (iv3) A step of selecting, from the obtained one or more paths, the shortest path (iv4) A step of adding the shortest path to the tree (iv5) A step of adding, upon determination that no paths from the added node to the selected nodes in the tree, which are closer to the added node, are shorter than the current straight path, the current path to the tree The RRT* algorithm however has to perform the sequence of the steps (iv1) to (iv4) or the sequence of the steps (iv1) and (iv5) each time of sampling a node in the step (i). This may result in a difficulty of high-speed and real-time planning of an optimal path from the start node to the goal node.

That is, we have to select, from the sampling-based algorithms, one algorithm in accordance with a trade-off between (i) optimality of a path from the start node to the goal node and (ii) a total exploring time required to determine a path from the start node to the goal node.

The sampling-based algorithms also include an A* (A star) algorithm as one of graph traversal and path search algorithms. Such an A* algorithm, which is an extension of Dijkstra's algorithm, is designed to determine an optimal path from a start node to a goal node using a heuristic function.

To sum up, the above sampling-based algorithms, which have the characteristics set forth above, can be used under an unknown execution environment in the exploring space, but may have much time required to determine an optimal path from a start node to a goal node.

On the other hand, the learning-based algorithms are designed to learn best actions possible in an exploring space using, for example, deep reinforcement learning or supervised learning, and cause a controlled target to perform the learned actions in the exploring space. These learning-based algorithms perform, in a learning mode, learning of best actions through trial-and-error processes with emphasis on optimality. This makes it possible for these learning-based algorithms to attain, in an execution mode, an optimal path from a start node to a goal node for a constant time independently of the complexity of the environment in the exploring space.

Additionally, hierarchical deep reinforcement learning engines, which are designed to perform reinforcement learning for each level in a plural-level hierarchical environment in an exploring space, have been proposed recently. An example of these engines is disclosed in non-patent literature 1, which is A. S. Vezhnevets et al., "*Feudal Networks for Hierarchical Reinforcement Learning*", CoRR, vol.abs/1703.01161, 2017.

The hierarchical deep reinforcement learning engine disclosed in non-patent literature 1 is equipped with at least first and second learning networks for respective first and second levels, which are different from each other, of the hierarchical environment in the exploring space. The first learning network for the first level of the hierarchical environment in the exploring space performs a learning operation with a predetermined first resolution, and the second learning network for the second level of the hierarchical exploring environment performs a learning operation with a predetermined second resolution that is different from the first resolution.

The hierarchical deep reinforcement learning engine, which is configured to perform divided learning operations for the respective levels of the hierarchical exploring environment, makes it possible to increase the efficiency of learning an optimal path in the exploring space. In other words, the hierarchical reinforcement learning engine enables efficient exploring of an optimal path or optimal route from a start point to a goal point in a broad exploring space.

For hierarchization of a deep reinforcement learning engine, i.e. a deep Q network, we consider a first approach, which divides the explore space into plural segments, and allocates individual learning networks for the respective divided segments. Hereinafter, this first approach will be referred to as an individual learning approach.

This individual learning approach may however require a large number of learning networks, which increases in proportion to the size of an exploring space, resulting in a large amount of hardware resources being required in order to attain an optimal path in a large exploring space.

For hierarchization of a deep reinforcement learning engine, we consider a second approach, which develops a single general learning network, which is capable of serving as an optimal learning network for each divided segment of the exploring space. Hereinafter, this second approach will be referred to as a generalization learning approach. This generalization learning approach is capable of attaining an optimal route in a large explore space with no need of using a large number of hardware resources, but may result in poor convergence.

For example, non-patent literature 2, which is A. Tamer et al., "*Value iteration networks*", Advances in Neural Information Processing Systems 29 (NIPS 2016), pp. 2146-2154, 2016, seems to describe that, even if such a generalization learning approach is used in a two-dimensional exploring environment in an exploring space, it may be difficult to provide a learning network that is capable of serving as an optimal learning network for each of various divided segment of the exploring space.

In view of the circumstances set forth above, an aspect of the present disclosure seeks to provide storage media and methods for learning a path even in a large state space, i.e. a large exploring space, each of which is capable of attaining a high-quality path while maintaining a high level of learning convergence.

According to a first exemplary aspect of the present disclosure, a computer-readable non-transitory storage medium includes a learning program that causes a processing apparatus to learn a path in an at least two-dimensional exploring space from an initial point to a goal point while avoiding at least one obstacle in the exploring space for movement of an agent from the initial point to the goal point. Each of the initial point, the goal point, and the at least one obstacle has corresponding absolute coordinates. The exploring space includes individual unit spaces segmentized therein. The learning program causes the processing apparatus to carry out 1. A first step of assembling the unit spaces in blocks to thereby construct unit blocks each comprised of corresponding unit spaces
2. A second step of combining the unit blocks with each other to thereby construct a block space
3. A third step of setting a sub initial point and a sub goal candidate region in the block space, the sub initial point corresponding to the initial point, the sub goal candidate region corresponding to the goal point
4. A fourth step of exploring, in the block space, a global path from the sub initial point to the sub goal candidate region for movement of the agent
5. A fifth step of limiting, based on the global path, the exploring space to thereby determine a limited space in the exploring space
6. A sixth step of arranging a sub goal in the limited space in accordance with a position of the goal point
7. A seventh step of transforming the absolute coordinates of each of the at least one obstacle and the sub goal in the limited space into corresponding relative coordinates relative to a position of the agent located in the limited space
8. An eighth step of exploring, in the limited space, a target path from the initial point to the sub goal According to a second exemplary aspect of the present disclosure, a method of learning a path in an at least two-dimensional exploring space from an initial point to a goal point while avoiding at least one obstacle in the exploring space for movement of an agent from the initial point to the goal point is provided. Each of the initial point, the goal point, and the at least one obstacle has corresponding absolute coordinates, the exploring space comprising individual unit spaces segmentized therein. The method includes a first step of assembling the unit spaces in blocks to thereby construct unit blocks each comprised of corresponding unit spaces, and a second step of combining the unit blocks with each other to thereby construct a block space. The method includes a third step of setting a sub initial point and a sub goal candidate region in the block space, the sub initial point corresponding to the initial point, the sub goal candidate region corresponding to the goal point. The method includes a fourth step of exploring, in the block space, a global path from the sub initial point to the sub goal candidate region for movement of the agent, and a fifth step of limiting, based on the global path, the exploring space to thereby determine a limited space in the exploring space. The method includes a sixth step of arranging a sub goal in the limited space in accordance with a position of the goal point, and a seventh step of transforming the absolute coordinates of each of the at least one obstacle and the sub goal in the limited space into corresponding relative coordinates relative to a position of the agent located in the limited space. The method includes an eighth step of exploring, in the limited space, a target path from the initial point to the sub goal.

According to a third exemplary aspect of the present disclosure, there is provided a system for learning a path in an at least two-dimensional exploring space from an initial point to a goal point while avoiding at least one obstacle in the exploring space for movement of an agent from the initial point to the goal point. Each of the initial point, the goal point, and the at least one obstacle has corresponding absolute coordinates, the exploring space comprising individual unit spaces segmentized therein. The system includes a memory, and a processing apparatus communicable with the memory. The processing apparatus is configured to 1. Assemble the unit spaces in blocks to thereby construct unit blocks each comprised of corresponding unit spaces
2. Combine the unit blocks with each other to thereby construct a block space
3. Set a sub initial point and a sub goal candidate region in the block space, the sub initial point corresponding to the initial point, the sub goal candidate region corresponding to the goal point
4. Explore, in the block space, a global path from the sub initial point to the sub goal candidate region for movement of the agent
5. Limit, based on the global path, the exploring space to thereby determine a limited space in the exploring space
6. Arrange a sub goal in the limited space in accordance with a position of the goal point
7. Transform the absolute coordinates of each of the at least one obstacle and the sub goal in the limited space into corresponding relative coordinates relative to a position of the agent located in the limited space
8. Explore, in the limited space, a target path from the initial point to the sub goal

EMBODIMENT

According to the inventor's viewpoint, the following describes exemplary embodiments of the present disclosure with reference to the accompanying drawings. In the exemplary embodiments and their modifications, like parts between the exemplary embodiments and their modifications are omitted or simplified to avoid redundant description.

First Embodiment

FIG. 1A schematically illustrates a path exploring system 100 according to the first embodiment of the present disclosure.

The path exploring system 100 is comprised of a specific hardware architecture AC that includes at least one processing apparatus 8, referred to simply as a processing apparatus.

The processing apparatus 8 includes at least hierarchized first and second learning machines Ed1 and Ed2, and a controller 9 for performing overall control of the first and second learning machines Ed1 and Ed2.

The first learning machine ED1 is comprised of a first deep neural network DNN1, and the second learning machine ED2 is comprised of a second deep neural network DNN2.

The specific hardware architecture AC includes a storage unit 10, serving as a memory, i.e. a computer-readable non-volatile storage medium, in which a learning program, i.e. a deep learning program, is stored. That is, the processing apparatus 8, which is for example comprised of a computer, is configured to operate in a learning mode to perform the learning program stored in the storage unit 10 to thereby determine a path exploring function, i.e. path exploring functional information, indicative of an optimal path from a start point to a goal point, for, for example, a robot 200 (see FIG. 1B).

In particular, the learning program according to the first embodiment has a hierarchical structure that is comprised of a global path search algorithm and a local path search algorithm. Each of the global path search algorithm and local path search algorithm according to the first embodiment is designed as a learning-based algorithm described above.

Referring to FIG. 1A, the processing apparatus 8 according to the first embodiment performs a reinforcement learning algorithm as the learning-based algorithm using the first and second deep neural networks DNN1 and DNN2. The processing apparatus 8 can perform a supervised learning algorithm as the learning-based algorithm using the first and second deep neural networks DNN1 and DNN2.

Specifically, the processing apparatus 8 is configured to select actions to be performed by an agent A0 interacting with an environment E defined in the storage unit 10.

The environment E represents, for example, the world through which the agent A0 can move, i.e. interact with directly or indirectly. For example, the environment E represents a simulated exploring space R1 corresponding to an actual exploring space where the robot 200 can move.

The agent A0 represents the learning and acting part of the path exploring system 100, which tries to maximize rewards given by the environment E.

The "actions" show all possible moves, i.e. transitions, between states in each of the environment E; every action can be performed by the agent A0.

A "state" in the environment E represents a concrete and immediate situation, i.e. a scenario, in which the agent A0 encounters. The agent transitions between different states by performing actions.

A "reward" shows the feedback received by the agent A0 from the environment E. From any given state, the agent A0 sends output of in the form of the actions to the corresponding environment, and the environment returns the agent's new state, which resulted from acting on the previous state, as well as rewards.

An observation represents a feature vector indicative of the current state.

For example, if the path exploring system 100 is applied to the robot 200 for determining an optimal path from a start point to a goal point for the robot, each environment E1, E2 simulates an actual exploring space, i.e. an actual state space, where the robot 200 is movable, and an agent is, for example, a software simulator that simulates motions of the robot 200 in each environment E1, E2. The observations about each environment E1, E2 can include measurements measured by one or more sensors mounted to the robot; these measurements characterize the corresponding environment E1, E2.

A "policy" represents a mapping from some states to the probabilities of selecting each possible action given for that state. For example, a greedy policy means that an agent constantly performs an action that is believed to yield the highest expected reward.

That is, the processing apparatus 8 receives observations characterizing a current state in the environment E, and selects, under a policy, an action in the set of actions performable by the agent A0 at the current state to thereby move to the next state. In response to some or all of the actions performed by the agent A0, the processing apparatus 8 receives a reward.

The processing apparatus 8 can select actions to be performed by the agent A0 in accordance with a Q-learning algorithm selected as the learning-based algorithm to thereby learn, as an optimal path exploring function, optimal Q values for the respective possible actions in each state; the optimal Q values for the respective possible actions in each state constitute an optimal Q table.

The Q value or Q function for a given action, which is denoted as Q(s, a) is a measure of the overall expected reward assuming that the agent A0 is in a state s and performs an action a, and then continues exploring until the end of a corresponding episode. In other words, the Q value represents an estimated return of the total long-term future reward received by the processing apparatus 8 as a result of the agent A0 performing the action under a policy from the current state; the Q-value can be estimated based on a predetermined Q-value update equation.

The "episode" represents all states that come in between an initial state and a terminal state. That is, the agent goal is to maximize the total reward during an episode. In situations where there is no terminal-state, we consider there to be an indefinite episode.

In the first embodiment, the processing apparatus 8 is configured to perform a deep Q-learning algorithm as the learning-based algorithm using the first and second deep neural networks DNN1 and DNN2 of the respective first and second learning machines Ed1 and Ed2.

Specifically, the processing apparatus 8 performs a learning data obtaining task that 1. Determines an action at a selected state in the environment E 2. Cause the agent A0 to move from the selected state to the next state to thereby obtain, from the environment E, the predetermined reward and the next state 3. Stores, in the storage unit 10, the set of the current state, the determined action, the obtained reward, and the next state as a sample 4. Repeats the operations 1 to 3 until the next state reaches a terminal state, thus obtaining many samples stored in the storage unit 10

Then, the processing apparatus 8 learns weights of each of the first and second deep neural networks DNN1 and DNN2 using the predetermined Q-value update equation and the samples that serve as training data to thereby obtain the corresponding one of the first and second deep neural networks DNN1 and DNN2 with the corresponding learned weights. The learned weights for the first deep neural network DNN1 serve as, for example, a first optimal path exploring function, and the learned weights for the second deep neural network DNN2 serve as, for example, a second optimal path exploring function.

Each of the first and second deep neural networks DNN1 and DNN2 of the first and second learning machines Ed1 and Ed2 includes an input layer Li, at least one intermediate layer (at least one hidden layer) Lm, and an output layer Lo.

The input layer Li is comprised of, for example, two units, the at least one intermediate layer Lm is comprised of, for example, three units, and the output layer Lo is comprised of, for example, two units. Each unit, also called as node or neuron, serves as, for example, a functional module, such as a hardware module, a software module, or the combination of hardware and software modules. Each unit in one layer in the neutral network NN is connected to all units in a layer next thereto. For example, each of the three units in the at least one intermediate layer Lm is connected to all units in the output layer Lo.

Each unit in the input layer Li receives a value corresponding to a selected state in the environment E, and multiplies the received value by a weight or a weight coefficient defined therefor to thereby output a value. Each unit in the at least one intermediate layer Lm receives the output values from the respective units in the input layer Li, and multiplies each of the received values by a weight coefficient defined therefor to thereby output the sum of the received values each multiplied by the weight coefficient. If the intermediate layer Lm consists of two or more intermediate layers, each unit in the next intermediate layer receives the output values from the respective units in the current intermediate layer, and multiplies each of the received values by a weight coefficient defined therefor to thereby output the sum of the received values each multiplied by the weight coefficient.

Each unit in the output layer Lo receives the output values from the respective units in the at least one inter mediate layer Lm, and multiplies each of the received values by a weight coefficient defined therefor to thereby output the sum of the received values each multiplied by the weight coefficient.

The processing apparatus 8 learns the weight coefficients of each of the first and second deep neural networks DNN1 and DNN2 using the many samples such that the output value of each unit in the output layer is sufficiently closer to a corresponding Q-value estimated by the Q-value update equation, thus obtaining an optimal weight-coefficient function based on the learned weight coefficients.

In particular, the processing apparatus 8 according to the first embodiment is configured to perform (1) The global path search algorithm using the first deep neural network DNN1 in an environment E2 corresponding to a block space R2 described later using a second agent A2

(2) The local path search algorithm using the second deep neural network DNN2 in an environment E1 corresponding to the actual exploring space R1 using a first agent A When completing the deep Q-learning algorithm, the processing apparatus 8 stores the optimal weight-coefficient function for each of the first and second deep neural networks DNN1 and DNN2 in the storage unit 10, thus terminating the operations in the learning mode.

Figure 11:
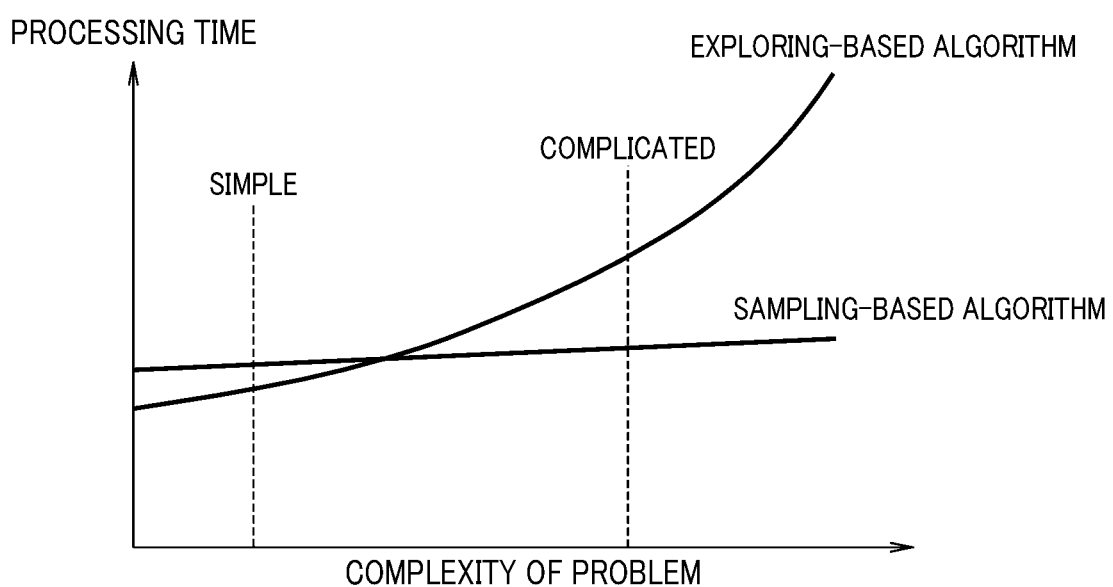
FIG. 11 is a graph schematically illustrating a result of comparison in processing time between any of the learning-based algorithms described in the first embodiment and any of the sampling-based algorithms described in the second embodiment.
Figure 12:
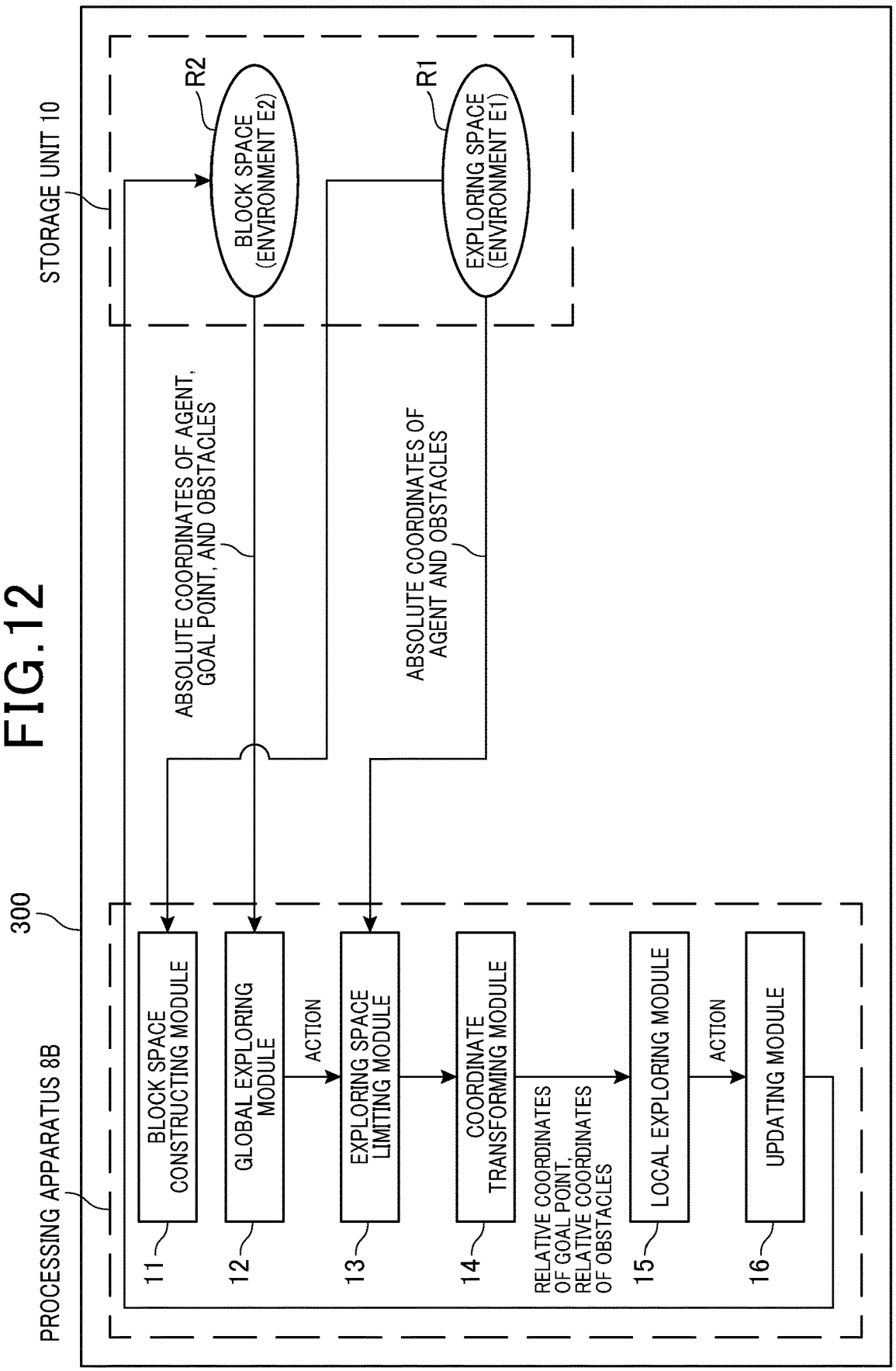
FIG. 12 is a functional diagram of a path exploring system according to the third embodiment of the present disclosure.
Figure 13:
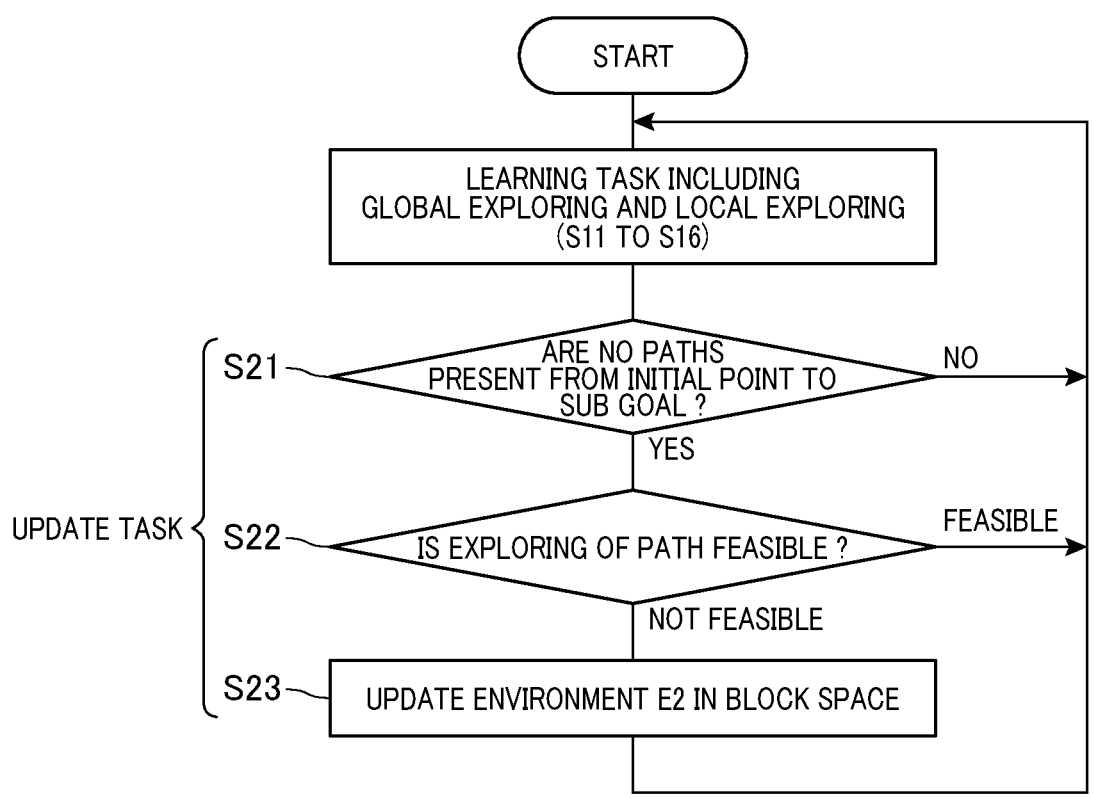
FIG. 13 is a flowchart schematically illustrating an updating task according to the third embodiment.

When causing the robot 200 to move from the start point to the goal point, the processing apparatus 8 operates in an execution mode to read the optimal Q table or the optimal weight-coefficient function to thereby (1) Perform a global exploring task using the first deep neural network DNN1 based on the optimal weight-coefficient function for the first deep neural network DNN1 and perform a local exploring task using the second deep neural network DNN2 based on the optimal weight-coefficient function for the second deep neural network DNN2 to thereby determine an optimal path (2) Cause the agent A0 to move in the environment E in accordance with the optimal path in a simulation, or cause the robot 200 to move in the actual exploring space in accordance with the optimal path That is, although the weight-coefficient function for each of the first and second deep neural networks DNN1 and DNN2 is obtained through trial-and-error processes set forth above in the learning mode, it is possible to determine the optimal path in accordance with the optimal weight-coefficient function for each of the first and second deep neural networks DNN1 and DNN2 within a substantially shorter constant processing time independently of the complexity of the environment E or the optimal path (see "PROCESSING TIME" in FIG. 11).

Figure 2:
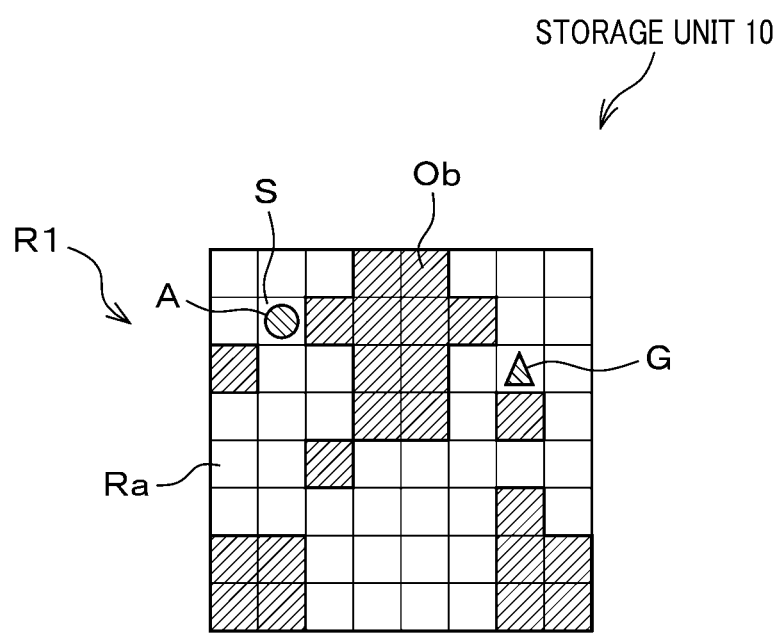
FIG. 2 is a diagram illustrating an exploring space.

Referring to FIG. 2, the exploring space R1, which corresponds to the environment E1, designed to simulate the actual exploring space has been prepared to be stored in the storage unit 10.

The exploring space R1 is a two or more-dimensional space that has been segmentalized into individual unit spaces Ra. That is, the exploring space R1 is defined as a space comprised of the individual unit spaces Ra.

In the exploring space R1, obstacles Ob are respectively arranged in corresponding unit spaces Ra, because corresponding obstacles Ob are arranged in the actual exploring space. The unit spaces Ra where the obstacles Ra are arranged will be referred to as obstacle unit spaces Ra(Ob).

This enables an initial point (a start point) S and a goal point G for the agent A to be respectively located at any two unit spaces Ra selected from the remaining unit spaces Ra except for the obstacle unit spaces Ra(Ob).

That is, the processing apparatus 8 is configured to determine any of the unit spaces Ra except for the obstacle unit spaces Ra(Ob) as the start point for the first agent A, and any of the remaining unit spaces Ra except for the start point and the obstacle unit spaces Ra as the goal point for the first agent A, making it possible to learn an optimal path from the start point to the goal point while avoiding the obstacle unit spaces Ra.

The exploring space R1 has an absolute coordinate space, so that, if the exploring space R1 is a two-dimensional space, each unit space Ra in the exploring space R1 has corresponding absolute coordinates (x, y) within the range from (0, 0) to (Xmax, Ymax) in a two-dimensional x-y coordinate system, so that each of the initial point S and the goal point G is expressed to have corresponding absolute coordinates, and the position of each obstacle unit space Ra(Ob) is also expressed to have corresponding absolute coordinates.

For example, as illustrated in FIG. 2, it is assumed that the exploring space R1 is comprised of vertically 8 unit-spaces Ra and horizontally 8 unit-spaces Ra, which is expressed by (8×8) exploring space R1. If the absolute coordinates (0, 0) to (7, 0) are allocated to the top row of the exploring space R1, and the absolute coordinates (0, 1) to (7, 1), . . . , and (0, 7) to (7, 7) are respectively allocated to the second row to the eighth row.

At that time, each unit space Ra in the exploring space R1 represent a state. When the first agent A is located at the absolute coordinates (2, 2), the first agent A has a state (2, 2).

When the first agent A at the initial point S with an initial state takes an action to move from the initial point S to any point, the initial state is changed to a different state at the moved point.

Hereinafter, for the sake of simplicity, we assume that the exploring space R1 according to the first embodiment is a two-dimensional space, so that each unit space Ra in the exploring space R1 has corresponding absolute coordinates (x, y) within the range from (0, 0) to (Xmax, Ymax) in a two-dimensional x-y coordinate system.

Figure 3:
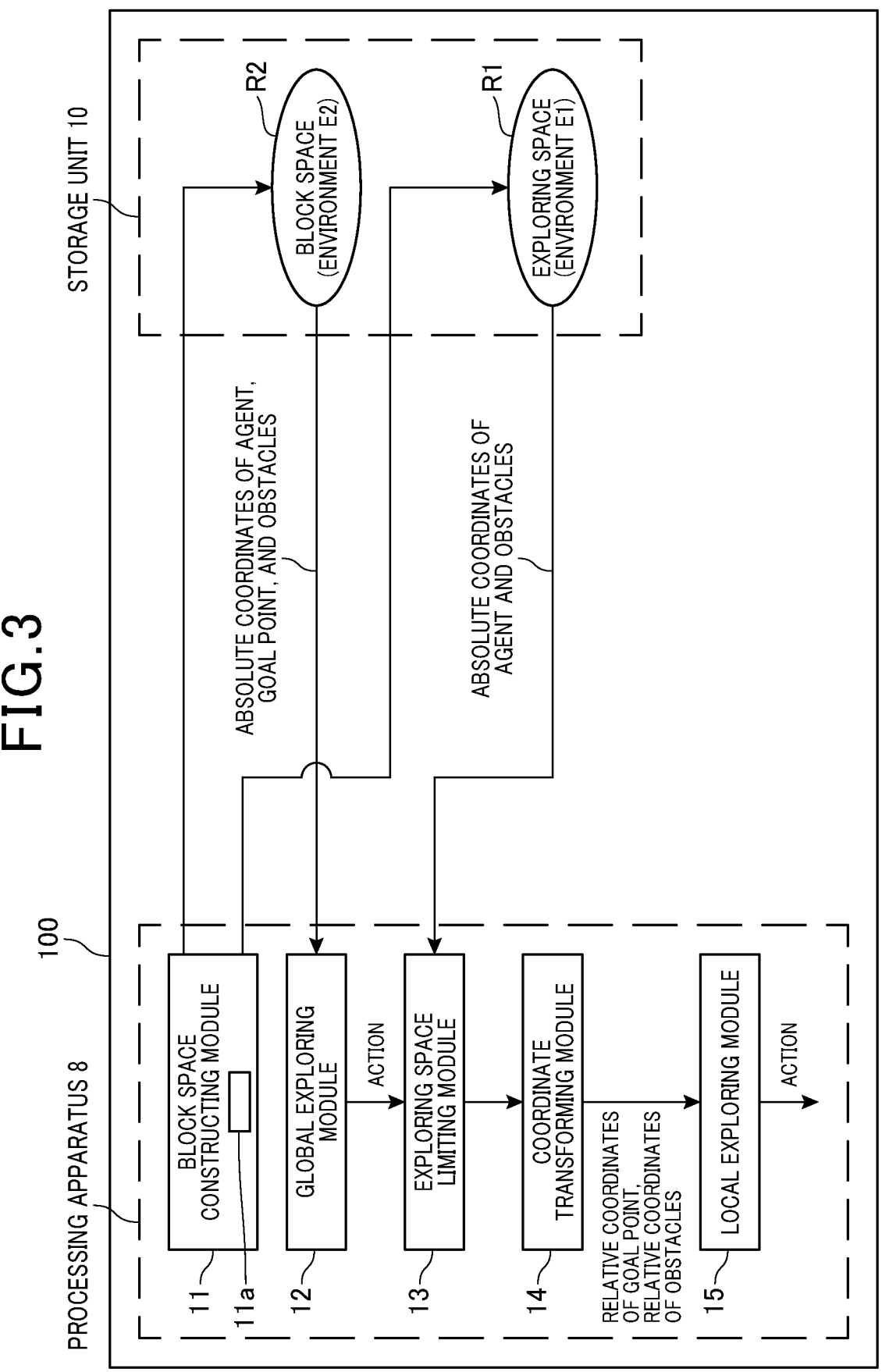
FIG. 3 is a functional diagram of the path exploring system.

FIG. 3 schematically illustrates an example of the functional structure of the processing apparatus 8, i.e. the controller 9 and the first and second learning machines Ed1 and Ed2. Referring to FIG. 3, the processing apparatus 8 serves as (i) a block space constructing module 11, (ii) a global exploring module 12, (iii) an exploring space limiting module 13, (iv) a coordinate transforming module 14, and a local exploring module 15 in the learning mode.

Figure 4:
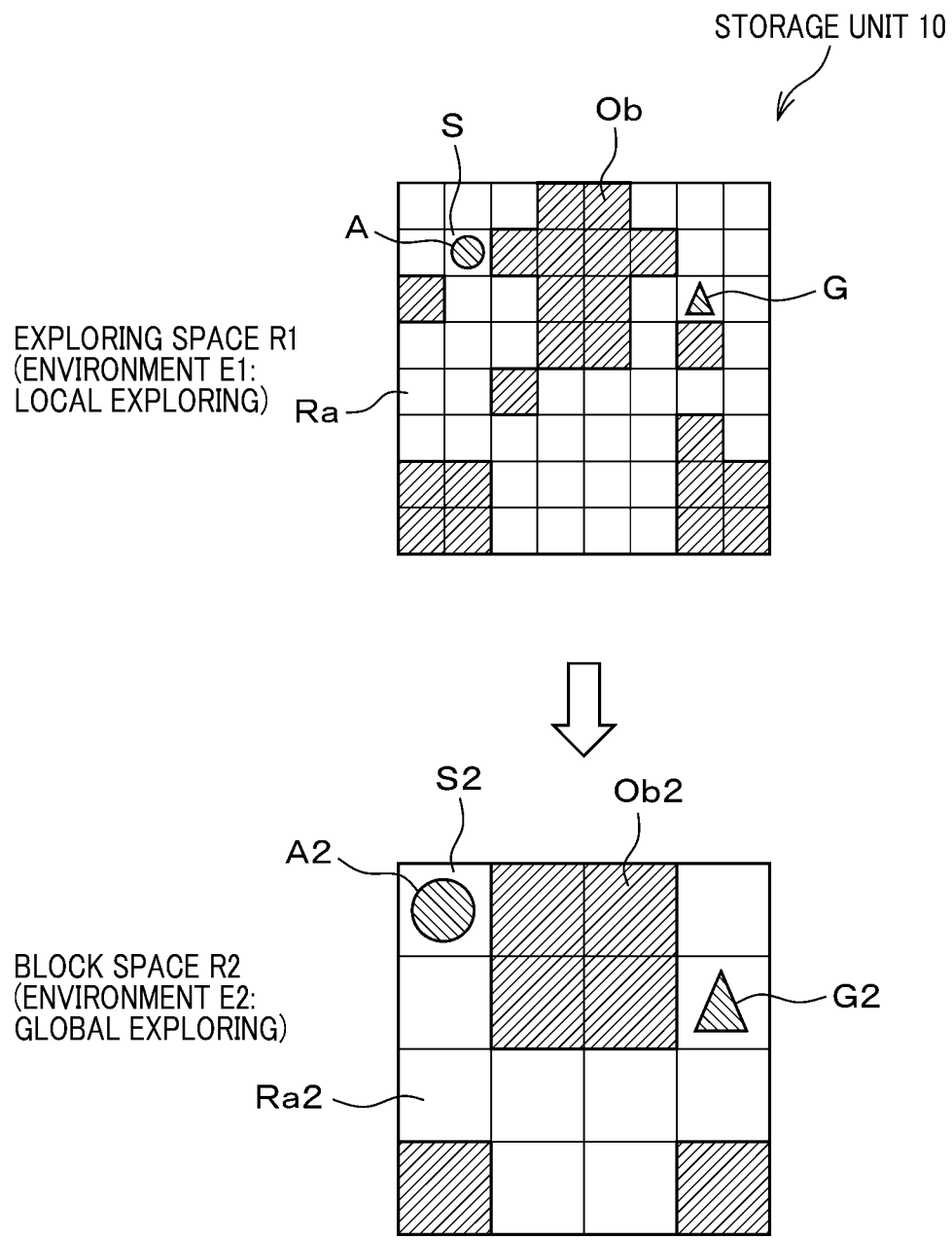
FIG. 4 is a diagram schematically illustrating a block space constructing task.
Figure 5:
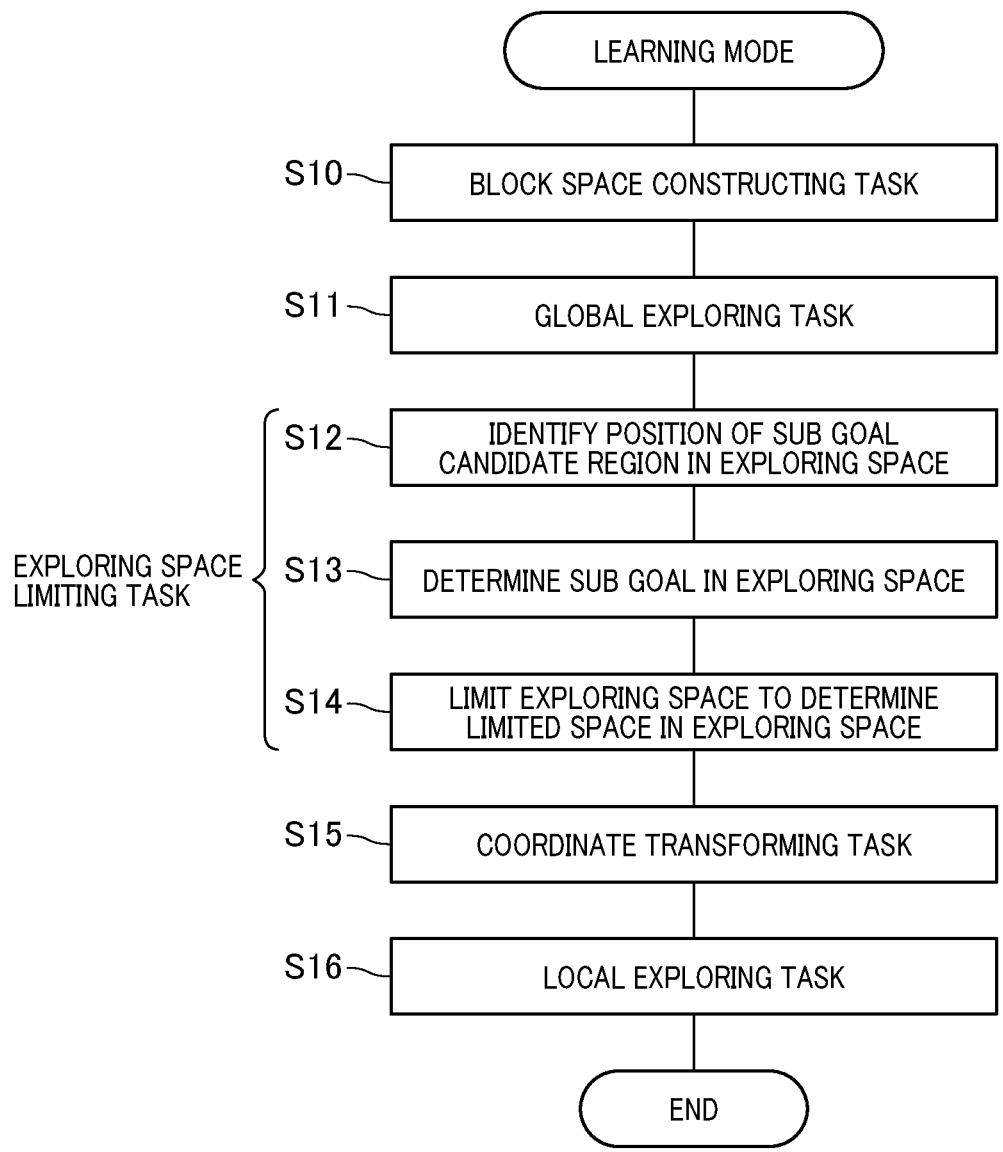
FIG. 5 is a flowchart schematically illustrating operations of a processing apparatus in a learning mode.

The following describes how the processing apparatus 8 serves as the block space constructing module 11 with reference to FIGS. 4 and 5.

The processing apparatus 8 serving as the block space constructing module 11 performs a task of assembling the unit spaces Ra in groups, i.e. blocks, of several unit spaces Ra to thereby construct unit blocks Ra2 each comprised of the corresponding several unit spaces Ra when starting operations in the learning mode in step S10 of FIG. 5.

The processing apparatus 8 serving as the block space constructing module 11 also performs a task of combining the constructed unit blocks Ra2 with each other to thereby construct a block space Ra2, and storing the constructed block space R2 in the storage unit 10 in addition to the exploring space R1.

For example, as illustrated in FIG. 4, it is assumed that the exploring space R1 is comprised of vertically 8 unit-spaces Ra and horizontally 8 unit-spaces Ra, which is expressed by (8×8) exploring space R1.

In this assumption, the processing apparatus 8 serving as the block space constructing module 11 performs a task of assembling the (8×8) exploring space R1 in groups, i.e. blocks, of (2×2) unit spaces Ra to thereby construct 16 unit blocks Ra2 each comprised of the corresponding (2×2) unit spaces Ra. The processing apparatus 8 serving as the block space constructing module 11 also performs a task of combining the constructed 16 unit-blocks Ra2 with each other to thereby construct the (4×4) block space R2, and storing the constructed (4×4) block space R2 in the storage unit 10 in addition to the exploring space R1.

For example, like the exploring space R1, it is assumed that the block space R2 is comprised of vertically 4 unit-block Ra2 and horizontally 4 unit-spaces Ra2, which is expressed by (4×4) block space R2. If the absolute coordinates (0, 0) to (3, 0) are allocated to the top row of the block space R2, and the absolute coordinates (0, 1) to (3, 1), . . . , and (0, 3) to (3, 3) are respectively allocated to the second row to the fourth row.

At that time, each unit block Ra2 in the block space R2 represents a state. If the second agent A2 is located at, for example, the absolute coordinates (2, 2), the second agent A2 has a state (2, 2) in an absolute coordinate system.

The block space R2 has a size larger than or equal to the size of the exploring space R1. Each unit block Ra2 is linked to the corresponding several unit spaces Ra in the exploring space R1. In other words, each unit block Ra2 is associated with the corresponding several unit spaces Ra in the exploring space R1.

The processing apparatus 8 serving as the block space constructing module 11 includes a determination module 11a that determines whether to arrange an obstacle Ob2 in each of the block spaces Ra2 upon assembling the unit spaces Ra in groups of several spaces Ra to thereby construct the unit blocks Ra2.

That is, the determining module 11a is configured to (1) Determine whether an obstacle Ob is arranged in each of the unit spaces Ra (2) Determine to arrange an obstacle Ob2 in at least one of the unit blocks Ra2 upon determining that at least one unit space Ra in which an obstacle Ob is arranged is included in the at least one of the unit blocks Ra2

(3) Determine not to arrange an obstacle Ob2 in at least one of the unit blocks Ra2 upon determining that all unit spaces Ra constituting the at least one of the unit blocks Ra2 include no obstacles Ob Next, the following describes how the processing apparatus 8 serves as the global exploring module 12 with reference to FIGS. 4 and 5.

The processing apparatus 8 serving as the global exploring module 12 performs a global exploring task in step S11 of FIG. 5.

Specifically, the processing apparatus 8 serving as the global exploring module 12 performs a first task of setting a sub initial point (a sub start point) S2 and a sub goal candidate region G2 in the block space R2 in step S11.

The processing apparatus 8 serving as the global exploring module 12 performs a second task of causing the second agent A2 to repeatedly move in the block space R2 from the sub initial point S2 to the sub goal candidate region G2, unit block Ra2 by unit block Ra2, to thereby learn a globally optimal weight-coefficient function in the block space R2 in step S11.

The sub initial point S2 in the block space R2 shows an initial position for the second agent A2 in the block space R2, and the sub goal candidate region G2 in the block space R2 shows a goal region for the second agent A2 in the unit block Ra2.

Specifically, the processing apparatus 8 serving as the global exploring module 12 sets, as the sub initial point S2 in the block space R2, a point corresponding to the position of the initial point S in the exploring space R1 in step S11.

Similarly, the processing apparatus 8 serving as the global exploring module 12 sets, as the sub initial point S2 in the block space R2, a point corresponding to the position of the goal point G in the exploring space R1 in step S11.

Note that, in FIG. 4, the initial point S, the goal point G, the unit spaces Ra, and the obstacles Ob in the exploring space R1 are illustrated to be distinguished from the sub initial point S2, the sub goal candidate region G2, the unit blocks Ra2, and the obstacles Ob2 in the block space R2.

After completion of the first task of setting the sub initial point S2 and the sub goal candidate region G2 in the block space R2, the processing apparatus 8 serving as the global exploring module 12 performs, in step S11, the second task of 1. Setting each of the sub initial point S2, the sub goal candidate region G2, the unit blocks Ra2, and the obstacles Ob2, and the second agent A2 in the block space R2 to corresponding absolute coordinates 2. Inputting, into the input layer Li of the first deep neural network DNN1, the absolute coordinates of each of the sub initial point S2, the sub goal candidate region G2, the unit blocks Ra2, and the obstacles Ob2, the second agent A2 in the block space R2 to cause the second agent A2 to repeatedly move, by trial and error, in the block space R2 from the sub initial point S2 to the sub goal candidate region G2, unit block Ra2 by unit block Ra2, to thereby learn the globally optimal weight-coefficient function in the block space R2.

That is, in step S11, if a path is established from the sub initial point S2 to the sub goal candidate region G2 without colliding with the obstacles Ob2, the global exploring module 12 deter mines that one complete session of learning is completed, and performs a next learning from the initial region S2 in the block space R2. Otherwise, if no path is established from the sub initial point S2 to the sub goal candidate region G2 because of colliding with one of the obstacles Ob2, the global exploring module 12 deter mines that one incomplete session of learning is completed, and performs a next learning from the sub initial point S2 in the block space R2.

As a result, when the number of the episodes has reached a previously specified number, the global exploring module 12 terminates the global exploring task, thus learning a finally optimal weight-coefficient function in the block space R2 for the first deep neural network DNN1 based on the learned weight coefficients as the first optimal path exploring function.

Then, the processing apparatus 8 serving as the global exploring module 12 performs a third task of learning, based on the first deep neural network DNN1 with the globally optimal weight-coefficient function, a globally optimal path from the sub initial point S2 to the sub goal candidate region G2 without passing through the obstacles Ob2 in step S11.

After completion of the global exploring task in step S11, the processing apparatus 8 serving as the exploring space limiting module 13 performs an exploring space liming task in steps S12 to S14 of FIG. 5.

Specifically, the exploring space limiting task includes a task of identifying the position of the sub goal candidate region G2 in the exploring space R1 in step S12. The exploring space limiting task also includes a task of determining, based on the identified position of the sub goal candidate region G2 in the exploring space R1, a sub goal Ga in the exploring space R1 in step S13.

Specifically, referring to FIG. 6, the determining task in step S13 selects one of the unit spaces Ra linked to the identified sub goal candidate region G2 in the exploring space R1, and determines the position of the selected unit space Ra as a target position, i.e. goal point, for the local exploring task in step S16.

In particular, the determining task in step S13 selects one of the unit spaces Ra linked to the identified sub goal candidate region G2 in the exploring space R1; the selected unit space Ra satisfies a condition that no obstacle Ob is located in the selected unit space Ra.

To sum up, the processing apparatus 8 is configured to perform the global exploring task to thereby determine the sab goal candidate region G2 in the block space R2 in accordance with the goal point G, and perform the exploring space limiting task to thereby determine the sub goal Ga in the exploring space R1. This configuration therefore enables the sub goal Ga to be determined to correspond to the goal point G, but the absolute coordinates of the sub goal Ga do not always match the absolute coordinates of the goal point G exactly.

As described later, the local exploring module 15 locates the first agent A at a selected one of the unit spaces Ra to which the position of the second agent A2 in the block space R2 is liked. For this reason, it is preferable to arrange the sub goal Ga to be closest to the position of the first agent A. This offers, to uses of the path exploring system 100, a benefit of reducing the number of states in the exploring space R1. This therefore makes it possible to achieve, even if an optimization problem of finding an optimal path needs to access many states in a given environment, an excellent solution, i.e. an optimal path, in the given environment while maintaining a high level of learning convergence.

The exploring space limiting module 13 performs a first limiting task of obtaining a limited space Rc2 from the current position of the second agent A2 to the sub goal candidate region G2 in the block space R2 in accordance with the globally optimal path learned by the global exploring task 12 in step S14 (see FIG. 6). Then, the exploring space limiting module 13 performs a second limiting task of limiting the exploring space R1 to determine a limited space Rc in the exploring space R1 in accordance with the determined limited space Rc2 (see FIG. 6). For example, the second limiting task limits the exploring space R1 such that the limited space Rc encloses the limited space Rc2 in the exploring space R1.

Figure 7:
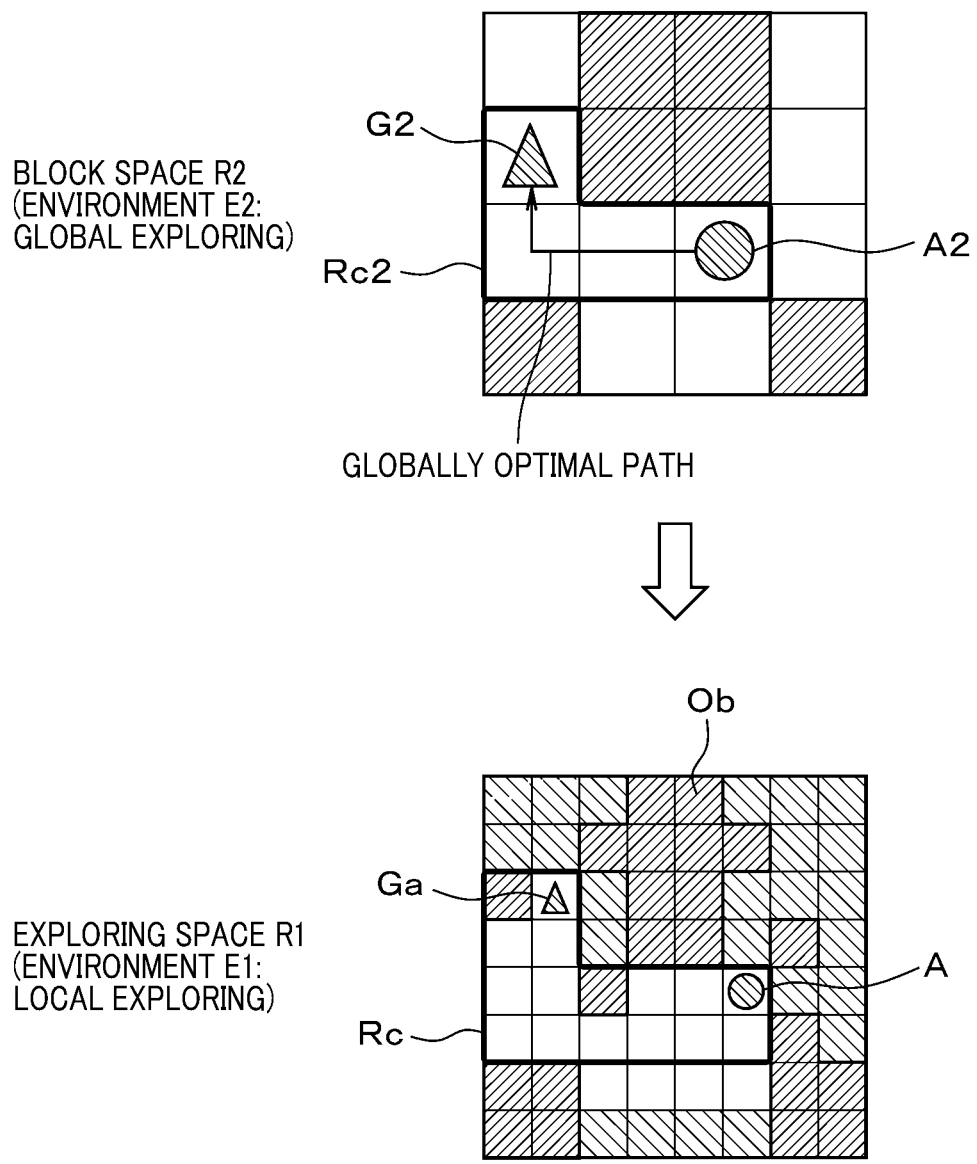
FIG. 7 is a diagram schematically illustrating a second example of an exploring space limiting task.

As another example, as illustrated in FIG. 7, the exploring space limiting module 13 can include a modified second limiting task of respectively arranging obstacles Ob in the remaining unit spaces Ra of the exploring space R1 except for the limited space Rc, thus removing the remaining unit spaces Ra of the exploring space R1 except for the limited space Rc from a learning target region to be learned by the local exploring task 15. This enables the local exploring task 15 to be more efficiently carried out.

After completion of the exploring space limiting task in steps S12 to S14, the processing apparatus 8 serving as the coordinate transforming module 14 performs, in step S15, a coordinate transforming task to thereby 1. Transform the absolute coordinates of each of the obstacles Ob included in the limited space Rc into relative coordinates of the corresponding one of the obstacles Ob relative to a current position of the first agent A in the exploring space R1

2. Transform the absolute coordinates of the sub goal Ga included in the limited space Rc into relative coordinates of the sub goal Ga relative to the current position of the first agent A in the exploring space R1

At that time, each unit block Ra in the limited space Rc in the exploring space R1 represents a state having coordinates relative to the current position of the first agent A in a relative coordinate system.

After completion of the coordinate transforming task, the processing apparatus 8 serving as the local exploring module 15 performs, in step S16, a local exploring task to thereby input, into the input layer Li of the second deep neural network DNN2, the relative coordinates of the sub goal Ga and the relative coordinates of each obstacle Ob included in the limited space Rc to cause the first agent A to repeatedly move, by trial and error, in the limited space Rc from the initial point S to the sub goal Ga to thereby learn, based on the learned weight coefficients, a finally optimal weight-coefficient function for the second deep neural network DNN2 in the limited space Rc.

That is, in step S16, if a path is established from the initial point S to the sub goal Ga without colliding with the obstacles Ob, the local exploring module 15 determines that one complete session of learning is completed, and performs a next learning from the initial point S in the limited space Rc. Otherwise, if no path is established from the initial point S to the sub goal Ga because of colliding with one of the obstacles Ob, the local exploring module 15 determines that one incomplete session of learning is completed, and performs a next learning from the initial point S in the limited space Rc.

As a result, when the number of the episodes has reached a previously specified number, the local exploring module 15 terminates the local exploring task, thus learning a finally optimal weight-coefficient function for the second deep neural network DNN2 in the limited space Rc based on the learned weight coefficients as the second optimal path exploring function.

Then, the processing apparatus 8 serving as the local exploring module 15 stores, in step S16, the finally optimal weight-coefficient function in the storage unit 10. This enables, based on the second deep neural network DNN2 with the locally optimal weight-coefficient function, a finally optimal path, i.e. the shortest path, from the initial point S to the sub goal Ga without passing through the obstacles Ob to be achieved in the execution mode.

Next, the following describes features of the path exploring system 100 according to the first embodiment, and shows simulation results of the learning system 100.

Figure 8:
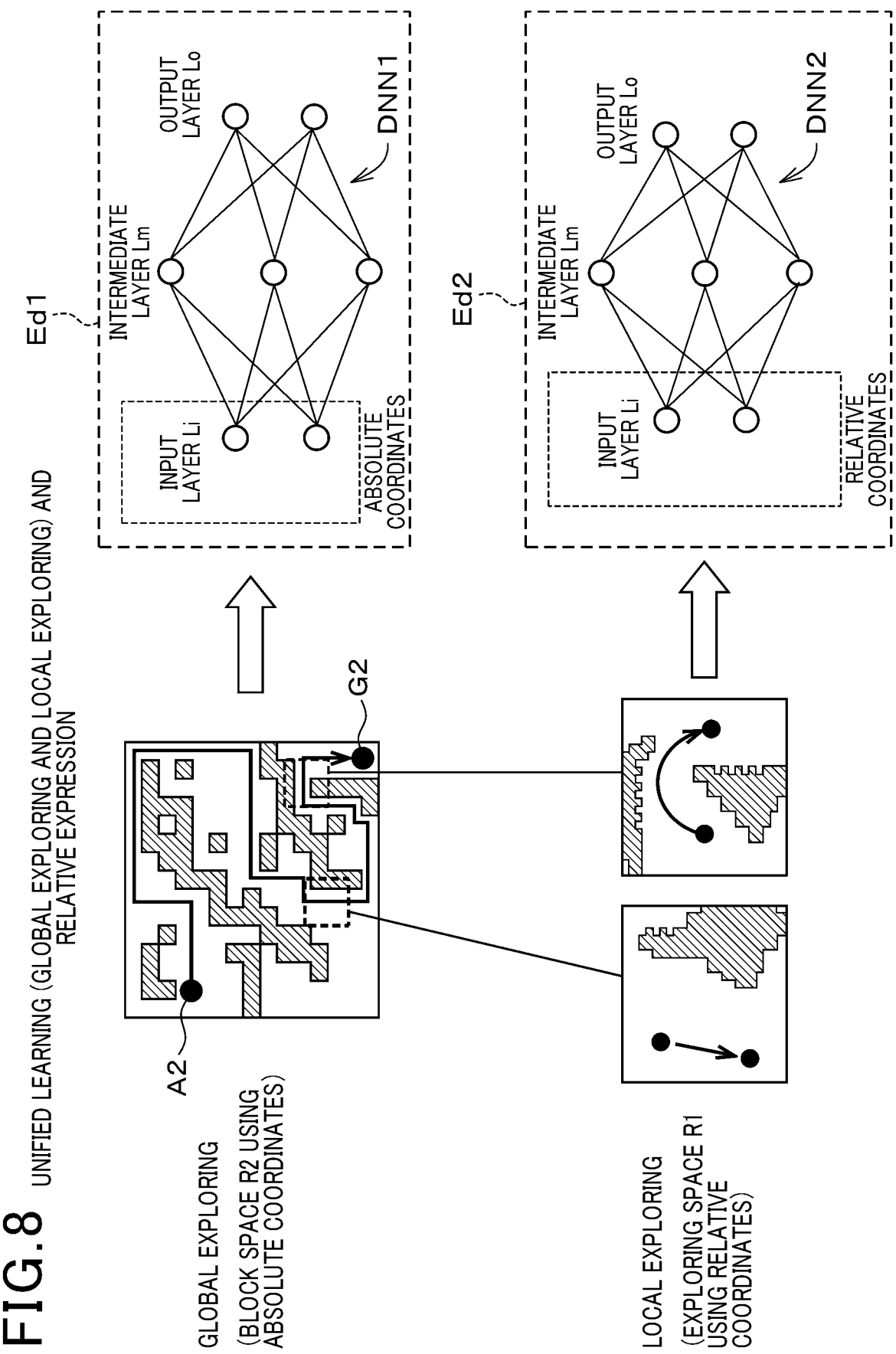
FIG. 8 is a diagram schematically illustrating a summary of features of the path exploring system.

We summarize the features of the path exploring system 100 with reference to FIG. 8.

As illustrated in FIG. 8, the path exploring system 100 is configured to (1) Perform the global exploring task using the first deep neural network DNN1 of the first learning machine Ed1 to repeatedly move the second agent A2 in the block space R2 from the sub initial point S2 to the sub goal candidate region G2, thus learning a globally optimal path from the sub initial point S2 to the sub goal candidate region G2 in the absolute coordinate system (2) Determining the sub goal Ga in the exploring space R1 in accordance with the position of the sub goal candidate region G2

(3) Limit the exploring space R1 to obtain the limited space Rc in the exploring space R1 in accordance with the globally optimal path (4) Perform the local exploring task using the second deep neural network DNN2 of the second learning machine Ed2 to repeatedly move the first agent A in the limited space Rc from the initial point S to the sub goal G2a, thus learning a finally optimal path from the initial point S to the sub goal Ga in a relative coordinate system relative to the first agent A Additionally, the path exploring system 100 is configured to employ, for each of the global exploring task and the local exploring task, a learning-based algorithm, such as the reinforcement learning algorithm based on the corresponding one of the first and second deep neural networks DNN1 and DNN2.

For example, let us assume that the exploring space R1 according to the first embodiment is an N-dimensional space, such as three-dimensional space, so that each unit space Ra in the exploring space R1 has corresponding absolute coordinates (x, y, z) within the range from (0, 0, 0) to (60, 60, 40) in a three-dimensional x-y-z coordinate system. In other words, the exploring space R1 is comprised of the three-dimensionally arranged unit spaces Ra, each of which has an address (x, y, z) selected from the range from (0, 0, 0) to (60, 60, 40). N is an integer larger than or equal to 2.

At that time, the disclosing persons of the present disclosure have confirmed that a comparative example approach, which does not employ the technological idea of the present disclosure, can learn an optimal path in the exploring space R1; the technological idea of the present disclosure employs the learning program having the hierarchical structure comprised of the global path search algorithm and the local path search algorithm.

Unfortunately, under the environment E1, that is, the exploring space R1, the number of combinations among the states of the respective current positions of the first agent A, the states of the goal point G, and the states of the respective positions of the obstacles Ob has reached an enormous number, requiring repeats of learning a path by at least the enormous number.

Additionally, we assume that the generalization learning approach, to which the technological idea of the present disclosure has been installed, is applied to the three-dimensional exploring space R1. However, because the generalization learning approach uses an absolute coordinate system for each of the global path search algorithm and the local path search algorithm, a large number of learning machines Ed, which increases in proportion to the size of the exploring space R1.

For example, if it is assumed that the exploring space R1 is comprised of the three-dimensionally arranged unit spaces Ra, each of which has an address (x, y, z) selected from the range from (0, 0, 0) to (60, 60, 40), we have simulated that 1728 learning machines Ed are required to learn an optimal path in the exploring space R1.

As described in the VIEWPOINT of the present disclosure, if the generalization learning approach is applied to the three-dimensional exploring space R1, the generalization learning approach can reduce the number of states in the three-dimensional exploring space R1, which is orders of magnitude less than the number of states in the three-dimensional exploring space R1 for the comparative example approach. In other words, if the generalization learning approach is applied to the three-dimensional exploring space R1, the generalization learning approach can reduce the number of states in the three-dimensional exploring space R1 to be smaller by approximately 99 percentage as compared with the number of states in the three-dimensional exploring space R1 for the comparative example approach.

Unfortunately, because the generalization learning approach needs to perform the local path search algorithm in each of local space environments, which are different from each other, using the absolute coordinate system, the number of states in the three-dimensional exploring space R1 may result in enormously increasing.

In contrast, the path exploring system 100, which is configured to employ the absolute coordinate system to repeatedly perform the global exploring task (step S11), and employ the relative coordinate system to repeatedly perform the local exploring task (step S16). This configuration enables the path exploring system 100 to be equipped with the merely single learning machine Ed1, Ed2 for performing each of the global exploring task and the local exploring task. This results in a reduction in the number of learning machines in the path exploring system as compared with that in a system using the above generalization learning approach, making it possible to reduce the hardware resources used in the path exploring system 100 as compared with those used in the system using the above generalization learning approach.

The path exploring system 100 is also configured to repeatedly perform the local exploring task using the relative coordinates of each of the sub goal Ga and the obstacles Ob relative to any position of the first agent A in the limited space Rc. This configuration enables the range within which the relative coordinates can take to be narrower in the exploring space R1.

For example, as described above, let us assume that the exploring space R1 is comprised of the three-dimensionally arranged unit spaces Ra, each of which has an address (x, y, z) selected from the range from (0, 0, 0) to (60, 60, 40). In this assumption, the above generalization learning approach may need to define the three-dimensional coordinate space for each of the repeated local exploring tasks using absolute coordinates within the range from 0 to 40 inclusive and within the range from 0 to 60 inclusive in the three-dimensional coordinate system.

In contrast, the path exploring system 100 makes it possible to define the three-dimensional coordinate space for each of the repeated local exploring tasks in the limited space Rc using relative coordinates within a limited range from, for example, 0 to 5 inclusive relative to the position of the first agent A. This enables the possibility of using already learned paths for exploring an optimal path to increase, making it possible to provide the path exploring system 100 with a higher learning efficiency.

This therefore results in a sufficient reduction in the number of combinations among the states of the current position of the first agent A, the states of the sub goal Ga, and the states of the respective obstacles Ob in the limited space Rc, making it possible to reduce time required to learn the finally optimal weight-coefficient function.

The path exploring system 100, which is capable of reducing the number of states in the exploring space R1 using the relative coordinate system relative to any position of the first agent A, enables an excellent solution to be achieved for an optimization problem having many states while maintaining a high level of learning convergence.

As described above, the path exploring system 100 according to the first embodiment is configured to employ, for each of the global exploring task and the local exploring task, a learning-based algorithm, such as the reinforcement learning algorithm, based on the corresponding one of the first and second deep neural networks DNN1 and DNN2, thus exploring an optimal path, i.e. the shortest path, from a selected start point to a goal point. This configuration results in a reduction in the number of learning machines and the hardware resources used in the local exploring task, improving the learning efficiency of the path exploring system 100.

Figure 9:
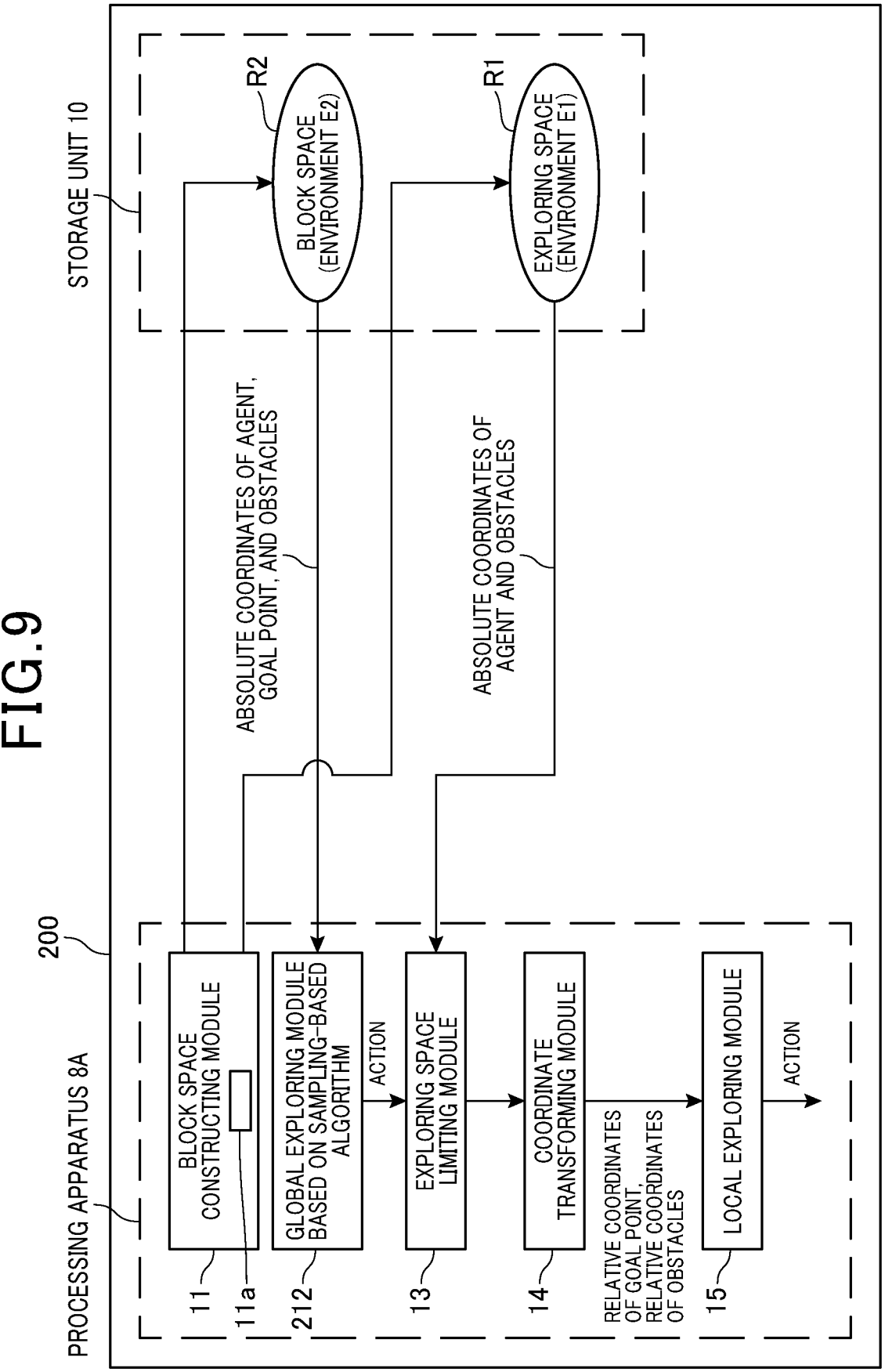
FIG. 9 is a functional diagram of a path exploring system according to the second embodiment of the present disclosure.
Figure 10:
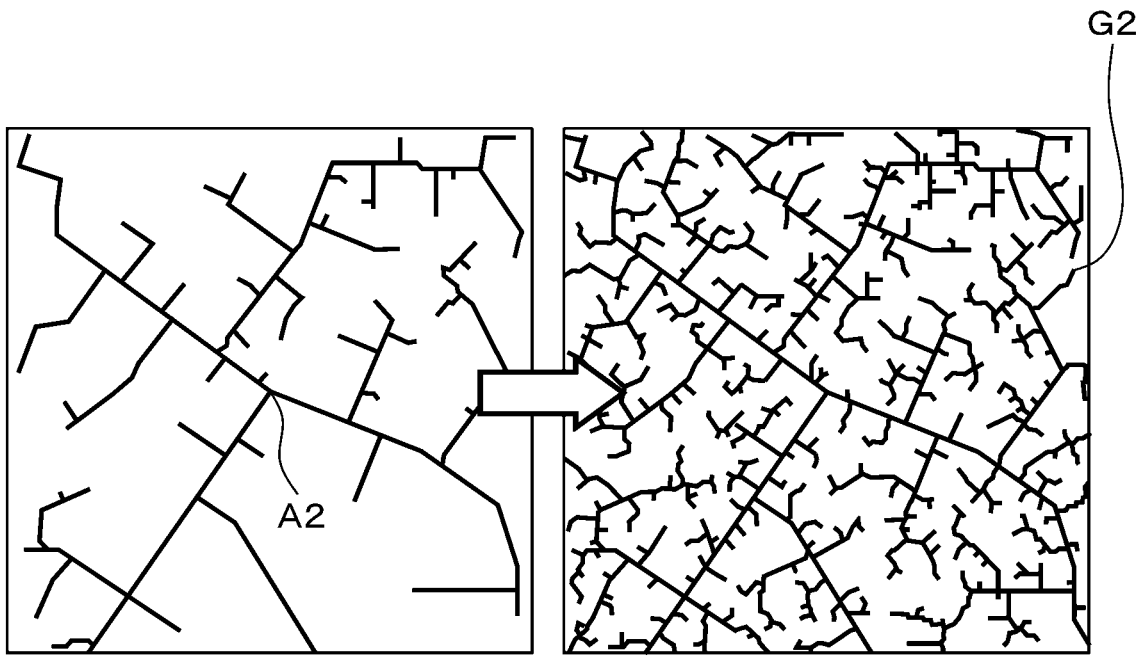
FIG. 10 is a diagram schematically illustrating a sampling-based algorithm.

In particular, it is preferable to perform the global exploring task based on a learning-based algorithm, and thereafter perform the local exploring task based on a learning-based algorithm for each of the following cases:

The first case is that the global exploring task is relatively complicated so that it takes much time to carry out the global exploring task based on a sampling-based algorithm, and also much time to carry out the local exploring task The second case is that updating of the environmental layout in the exploring space R1 is relatively not carried out frequently Second Embodiment The following describes the second embodiment of the present disclosure with reference to FIGS. 9 to 11. The configuration and functions of a path exploring system 200 according to the second embodiment are mainly different from those of the path exploring system 100 according to the first embodiment by the following points. The following therefore mainly describes the different points.

The path exploring system 200 of the second embodiment includes a processing apparatus 8A, and the processing apparatus 8A includes a global exploring module 212 that performs a global exploring task based on a sampling-based algorithm. In contrast, the processing apparatus 8A of the path exploring system 200 includes the local exploring module 15 that performs the local exploring task based on a learning-based algorithm, which is similar to the first embodiment.

As described in the VIEWPOINT, sampling-based algorithms perform real-time exploring of a path between a start point (start node) and a goal point (goal node) in an exploring space or a state space when executed.

The global exploring module 212 performs, for example, a selected one of the sampling-based algorithms, such as an RRT algorithm or an A* algorithm.

Specifically, the global exploring module 212 performs, based on the RRT algorithm, the following:

(i) A step of randomly sampling a point, i.e. a node, in the block space R2

(ii) A step of arranging the second agent A2 at the sampled point (iii) A step of checking whether the sampled point collides with the obstacles Ob in the block space R2

(iv) A step of checking, upon determination that the sampled point has no collisions with the obstacles Ob, whether a straight current path, i.e. a straight current link, between the sampled point and the nearest existing point in the tree has any collisions with the obstacles Ob; in the first time sampling, the nearest existing point is the start point (v) A step of adding, upon determination that the current path has no collisions, the sampled point and the current path to the tree with the nearest point as its parent point to thereby develop the tree (vi) A step of throwing out, upon determination that there is a collision between the current path and an obstacle Ob, the sampled point, returning to the step (i)

(vii) A step of checking, each time after a point is added to the tree, whether the added point is less than a threshold distance from the sub goal candidate point G2

(viii) A step of checking, upon determination that the added point is less than the threshold distance from the sub goal candidate point G2, whether the sub goal candidate point G2 is reachable in a straight path from the added point (ix) A step of adding, upon determination that the sub goal candidate point G2 is reachable, the sub goal candidate point G2 to the tree with the most recently added point as its parent point, thus being completed (x) A step of repeating, if the sub goal candidate point G2 is unreachable, the steps (i) to (ix) until a result of the determination in the step (viii) is reachable (see FIG. 10)

FIG. 11 schematically illustrates that a time required to perform any of the learning-based algorithms described in the first embodiment is substantially maintained although the complexity of a problem to be solved by the corresponding learning-based algorithm increases. In contrast, FIG. 11 schematically illustrates that a time required to perform any of the sampling-based algorithms described in the second embodiment may increase as the complexity of a problem to be solved by the corresponding sampling-based algorithm increases.

From this viewpoint, the global exploring module 12 is configured to perform a sampling-based algorithm in the environment E2 corresponding to the block space R2. This configuration results in a smaller processing load of the processing apparatus 8A. This therefore enables the processing apparatus 8A of the system 200 to perform the global exploring task in accordance with a selected sampling-based algorithm.

That is, because a time required for the processing apparatus 8A to perform a selected sampling-based algorithm in the block space R2 becomes a sufficiently practical time, it is possible to use a selected sampling-based algorithm to thereby perform the global exploring task. The path exploring system 200, which uses a selected sampling-based algorithm to thereby perform the global exploring task, makes it possible to address unknown environments.

In particular, the path exploring system 200, which uses a selected sampling-based algorithm to thereby perform the global exploring task, can be preferably used for a case where the path exploring system 200 can perform the global exploring task relatively easily whereas performing the local exploring task with a relatively large amount of time.

The path exploring system 200, which uses a selected sampling-based algorithm to thereby perform the global exploring task, can be preferably applied to application software that frequently performs layout change of the environment E1 corresponding to the exploring space R1 or to application software that frequently changes the positions of one or more obstacles Ob.

Third Embodiment

The following describes the third embodiment of the present disclosure with reference to FIGS. 12 to 18. The configuration and functions of a path exploring system 300 according to the third embodiment are mainly different from those of the path exploring system 100 according to the first embodiment by the following points. The following therefore mainly describes the different points.

The path exploring system 300 of the third embodiment includes a processing apparatus 8B, and the processing apparatus 8B includes an updating module 16 capable of updating the environment E2 corresponding to the block space R2.

As illustrated in FIG. 5 and described in step S16 according to the first embodiment, the processing apparatus 8B determines whether no paths are present from the initial point S to the sub goal Ga in step S21.

Upon determination that at least one path is present from the initial point S to the sub goal Ga (NO in step S21), the processing apparatus 8B learns an optimal weight-coefficient function set forth above. Then, the processing apparatus 8B returns to step S11, and performs the operations in steps S11 to S16, thus learning an optimal path from the start point to the goal point again in a corresponding environment.

Otherwise, upon determination that no paths are present from the initial point S to the sub goal Ga (YES in step S21), the processing apparatus 8B determines that it is difficult to explore any path from the initial point S to the sub goal G2 without colliding with the obstacles Ob.

The following describes an example of the limiting task in the learning mode where the second agent A2 is capable of moving from a current position, i.e. a current unit space Ra2, to the sub goal candidate region G2 that is adjacent to the current position of the second agent A2.

Figure 14:
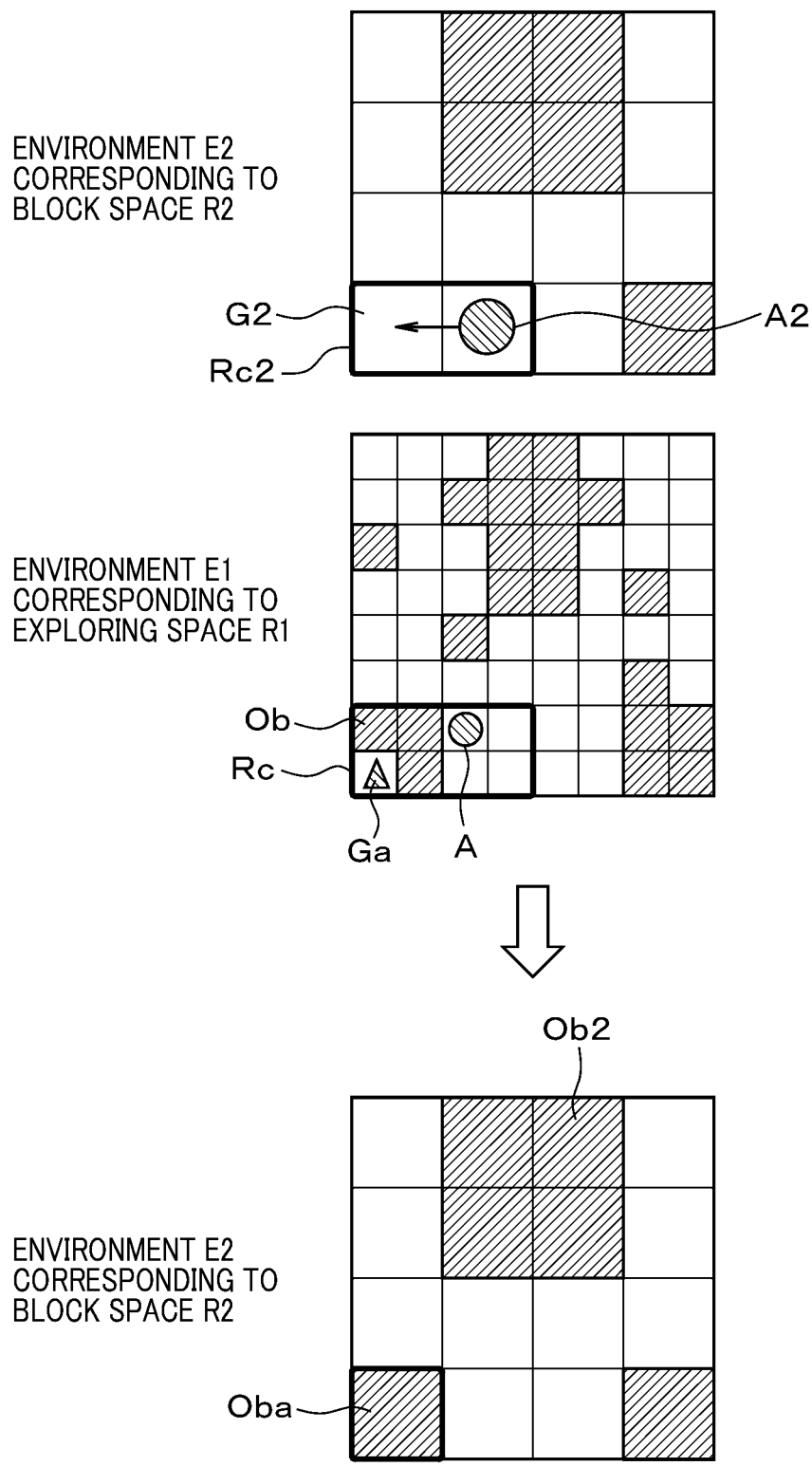
FIG. 14 is a diagram schematically illustrating a first example of the exploring space limiting task according to the third embodiment.

At that time, the processing apparatus 8B performs the first limiting task of obtaining a limited space Rc2 from the current position of the second agent A2 to the sub goal candidate region G2 in the block space R2 in accordance with the globally optimal path learned by the global exploring task 12 in step S14 (see FIG. 14). Then, the processing apparatus 8B performs the second limiting task of limiting the exploring space R1 to obtain a limited space Rc in the exploring space R1 in accordance with the obtained limited space Rc2 (see FIG. 14).

Next, the processing apparatus 8B performs the local exploring task in accordance with the relative coordinates of each of the obstacles Ob and the sub goal Ga relative to the initial point S of the first agent A in the exploring space R1.

Unfortunately, as illustrated in FIG. 14, because many obstacles Ob are arranged in the limited space Rc under the environment E1 corresponding to the exploring space R1, the obstacles Ob block effective paths from the current position of the second agent A2 to the sub goal Ga located based on the sub goal candidate region G2. In this situation, the determination in step S21 is affirmative.

In response to the affirmative determination in step S21, the processing apparatus 8B performs a feasibility check of at least one path in the limited space Rc to thereby check whether exploring of at least one path is feasible in step S22.

Specifically, the processing apparatus 8B performs, as the feasibility check of at least one path, the local exploring task in accordance with the sampling-based algorithm while maintaining the current position of the first agent A, the arrangement of the sub goal candidate region G2 and the obstacles Ob2 in the environment E2, and the arrangement of the sub goal Ga and the obstacles Ob in the environment E1. This enables one or more causes of no paths to be figured out.

Upon determination that exploring of at least one path is feasible (YES in step S22), the processing apparatus 8B repeatedly performs the operations in steps S11 to S16, S21, and S22 until the number of the negative determinations in step S21 has exceeded a predetermined number. In particular, if there are one or more other unit spaces Ra linked to the identified sub goal candidate region G2 in the exploring space R1, the processing apparatus 8B selects one of the other unit spaces Ra, and arranges the sub goal G2 to the selected unit space Ra, thus repeatedly performing the operations in steps S11 to S16, S21, and S22.

Otherwise, upon determination that exploring of at least one path is not feasible (NO in step S22), the processing apparatus 8B serves as the updating module 16 to perform an updating task of updating the environment E2 corresponding to the block space R2 in step S23. For example, when updating the environment E2 corresponding to the block space R2 in step S23, the processing apparatus 8B arranges an obstacle Oba in the sub goal candidate region G2 in the environment E2 as illustrated in FIG. 14, and arranges obstacles Ob in all the unit spaces Ra corresponding to the sub goal candidate region G2 in the exploring space R1. This enables the processing apparatus 8B to regard the sub goal candidate region G2 in which exploring of at least one path is determined to be difficult as the obstacle Oba, and similarly regard the region corresponding to the sub goal candidate region G2 in the exploring space R1 as the obstacles Ob. This therefore makes it possible for the path exploring apparatus 300 to have a higher learning efficiency and a higher exploring efficiency.

The following describes specific examples of operations of the processing apparatus 8B with reference to FIGS. 15 to 18.

Figure 15:
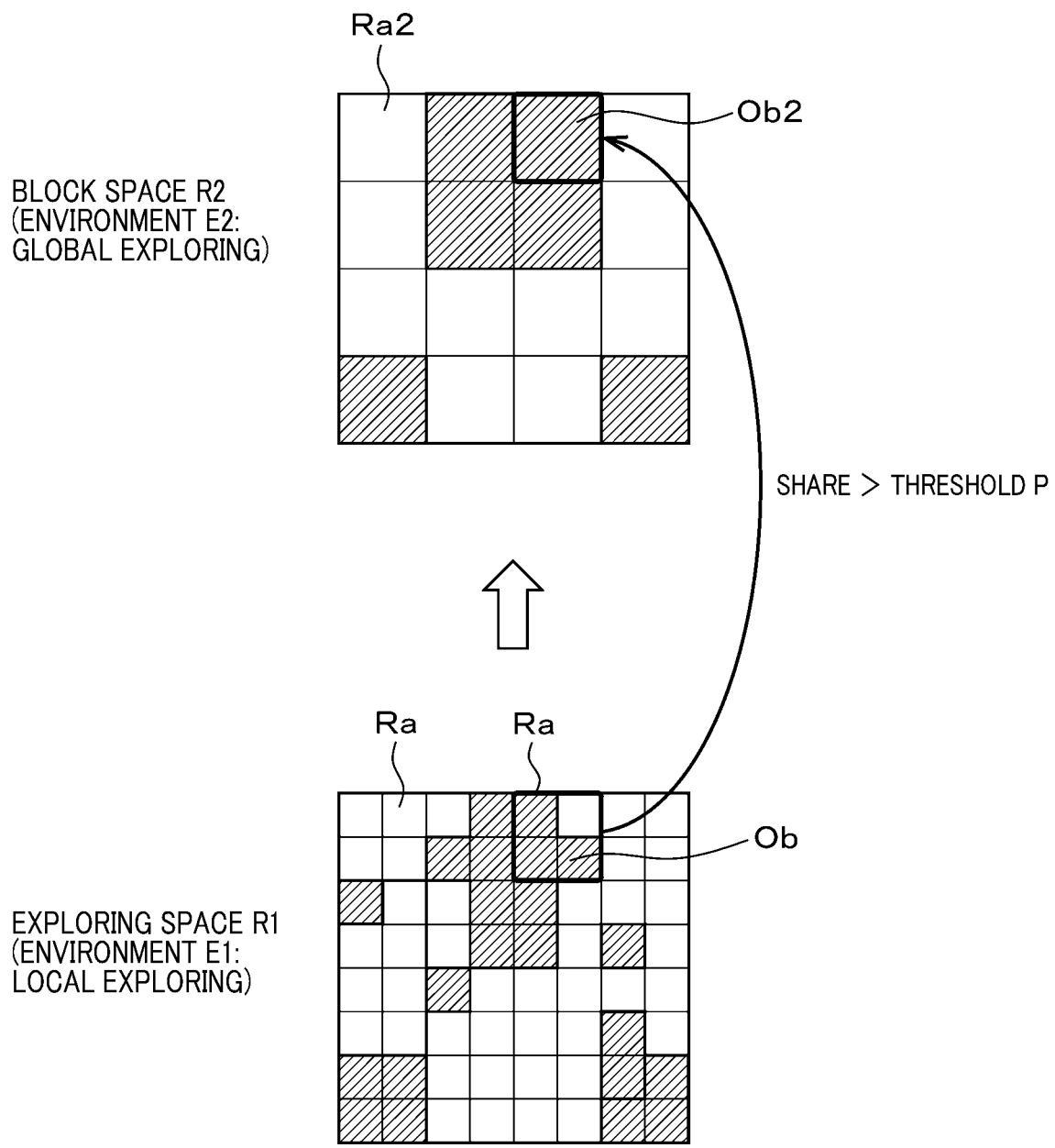
FIG. 15 is a diagram schematically illustrating a second example of the exploring space limiting task according to the third embodiment.

As illustrated in FIG. 15, it is assumed that the exploring space R1 is comprised of vertically 8 unit-spaces Ra and horizontally 8 unit-spaces Ra, which is expressed by (8×8) exploring space R1.

In this assumption, the processing apparatus 8B serving as the block space constructing module 11 performs a task of assembling the (8×8) exploring space R1 in groups, i.e. blocks, of (2×2) unit spaces Ra to thereby construct 16 unit blocks Ra2 each comprised of the corresponding (2×2) unit spaces Ra. The processing apparatus 8 serving as the block space constructing module 11 also performs a task of combining the constructed 16 unit-blocks Ra2 with each other to thereby construct the (4×4) block space R2 corresponding to the environment E2 (see step S10 in FIG. 5).

In step S10, each of the processing apparatuses 8 and 8B can determine whether to arrange one or more obstacles Ob2 in each unit block Ra2 in accordance with a share of the obstacles Ob in a region of the exploring space R1; the region corresponds to the unit block Ra2.

For example, if a value of the share of the obstacles Ob in a region of the exploring space R1, which corresponds to a selected unit block Ra2, is higher than a predetermined threshold P, it is preferable that each of the processing apparatuses 8 and 8B arranges one or more obstacles Ob2 in the selected unit block Ra2. In particular, a value of the threshold P is preferably set to be a higher value than a reference value during an early stage of the learning.

Hierarchical learning using the hierarchical learning program comprised of the global path search algorithm and the local path search algorithm usually needs to grantee solution integrity while improving solution optimality.

Figure 16:
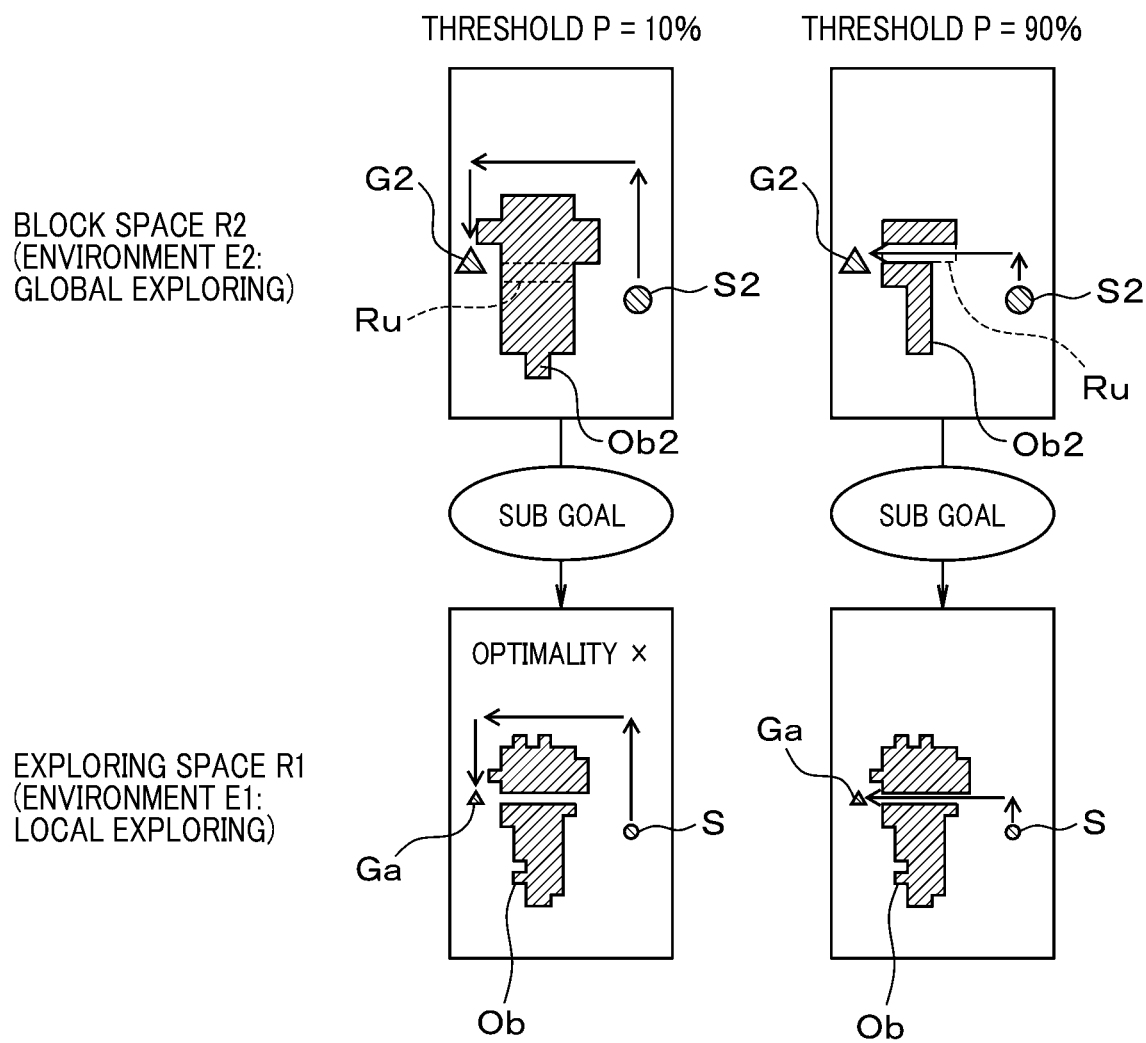
FIG. 16 is a diagram schematically illustrating an example of the relationship between a threshold and solution optimality

FIG. 16 schematically illustrates an example of the relationship between the threshold P and the solution optimality. If the value of the threshold P is set to a relatively low value of 10%, the processing apparatus 8 or 8B may arrange an obstacle Ob2 in a selected unit block Ra2 in the block space R2; the selected unit block Ra2 corresponds to a relatively narrow path Ru in the exploring space R1.

For this reason, even if the processing apparatus 8 or 8B has learned a path from the sub initial point S2 to the sub goal candidate region G2, as illustrated in the left of FIG. 16, the processing apparatus 8B may determine a relatively roundabout path as an optimal path.

From this viewpoint, the processing apparatus 8 or 8B preferably sets the value of the threshold P to a relatively higher value, such as 90%, during an early stage of the learning. This enables the processing apparatus 8 or 8B not to arrange an obstacle Ob2 in a selected unit block Ra2 in the block space R2; the selected unit block Ra2 corresponds to a relatively narrow path Ru in the exploring space R1. That is, if a value of the share of the obstacles Ob in a region of the exploring space R1, which corresponds to a selected unit block Ra2, is lower than or equal to the threshold P, the processing 8 or 8B is preferably configured not to arrange one or more obstacles Ob2 in the selected unit block Ra2.

Figure 17:
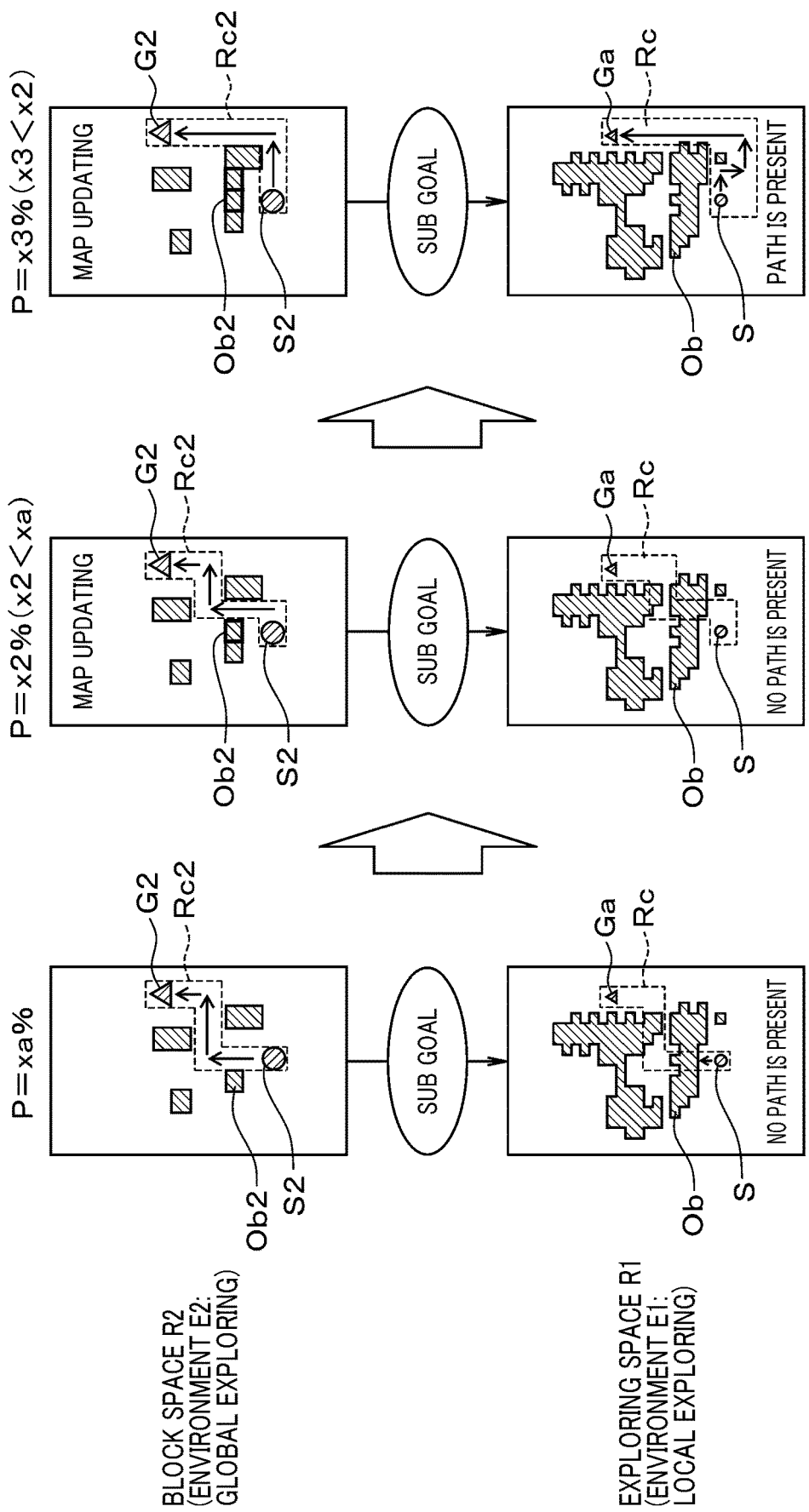
FIG. 17 is a diagram schematically illustrating an example of how the updating task is performed.

As illustrated in the left of FIG. 17, it is assumed that the value of the threshold P is set to a relatively higher value xa % during an early stage of the learning. In this assumption, even if many obstacles Ob are arranged in the exploring space R1, some of the obstacles Ob can be regarded to be absent during an early stage of the learning. This enables obstacles Ob2 to be less likely to be arranged in the corresponding block space R2. For this reason, when the processing apparatus 8B performs the global exploring task to thereby explore a globally optimal path in the block space R2, the processing apparatus 8B can explore a shortest path from the sub initial point S2 to the sub goal candidate region G2 under the environment E2 corresponding to the block space R2.

However, because some of the obstacles Ob are regarded to be absent during an early stage of the learning, there is a high possibility of at least one obstacle Ob being in an optimal path in the exploring space R1. In this case, as illustrated in the left of FIG. 17, even if the processing apparatus 8B determines a limited space Rc in the block space R2 as the environment E2, and performs the local exploring task in the limited space Rc in the exploring space R1, it may be difficult to explore paths in the exploring space R1 as the environment E1. This may result in it being determined that no paths are present from the initial point S to the sub goal G2 in step S21.

Figure 18:
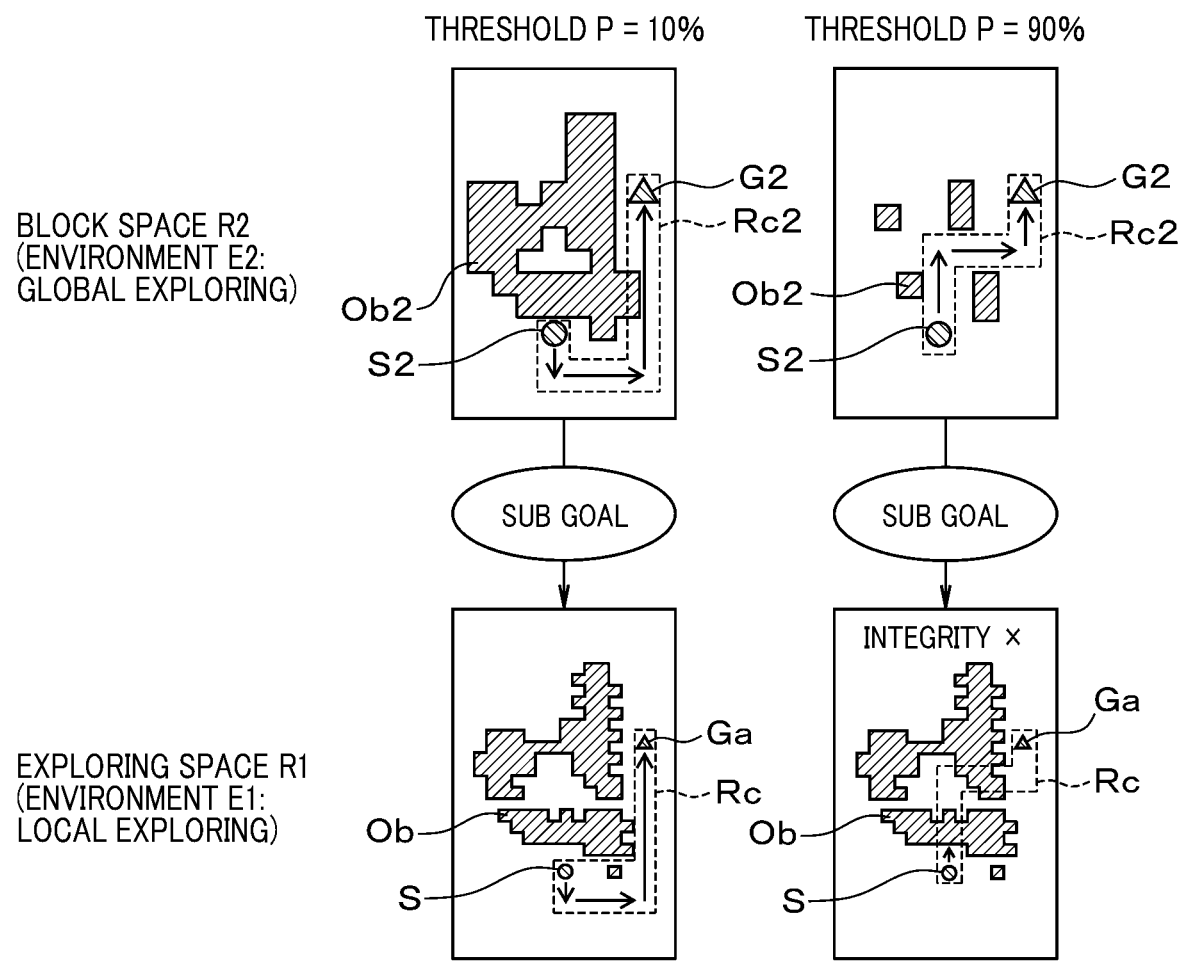
FIG. 18 is a diagram schematically illustrating an example of the relationship between a threshold and solution integrity.

FIG. 18 illustrates an example of the relationship between the threshold P and the solution integrity. If the value of the threshold P is set to a relatively high value of 90%, when setting a limited space Rc in the exploring space R1 based on a globally optimal path obtained in the block space R2 and performing the local exploring task in the limited space Rc, the processing apparatus 8B may not explore an optimal path in the limited space Rc. In this situation, setting the value of the threshold P to a relatively low value of 10% enables the processing apparatus 8B to be likely to explore an optimal path.

From this viewpoint, the processing apparatus 8B of the third embodiment updates the value of the threshold P in the limited space Rc in the block space R2 to decrement it by a predetermined value from an initial high value xa % each time of performing the updating task in step S23, and thereafter repeatedly performs the operations in steps S11 to S16, S21, S22, and S23. This enables the value of the threshold P to gradually decrease, thus enabling the number of obstacles Ob2 in the block space R2 to gradually increase.

As illustrated in the middle of FIG. 17, when setting the value of the threshold P for the share of obstacles Ob to a value x2% that is lower than the value xa %, the number of arrangement of obstacles Ob in the exploring space R1. For this reason, when the processing apparatus 8B performs the local exploring task in step S16 again, the processing apparatus 8B determines that no paths are present from the initial point S to the sub goal Ga, thus updating the environment E2 corresponding to the block space R2 again.

Thereafter, as illustrated in the right of FIG. 17, when setting the value of the threshold P for the share of obstacles Ob to a value x3% that is lower than the value x2%, the obstacles Rb2 can block a path located at a center region of the block space R2 illustrated in the right of FIG. 17, making it possible to greatly change the limited space Rc2.

A great change of the limited space Rc2 under the environment E2 corresponding to the block space R2 enables the processing apparatus 8B to determine the limited space Rc in the exploring space R1 in accordance with the greatly changed limited space Rc when performing the local exploring task. This results in an optimal path in the limited space Rc being more easily explored, thus guaranteeing the solution integrity.

Fourth Embodiment

Figure 19:
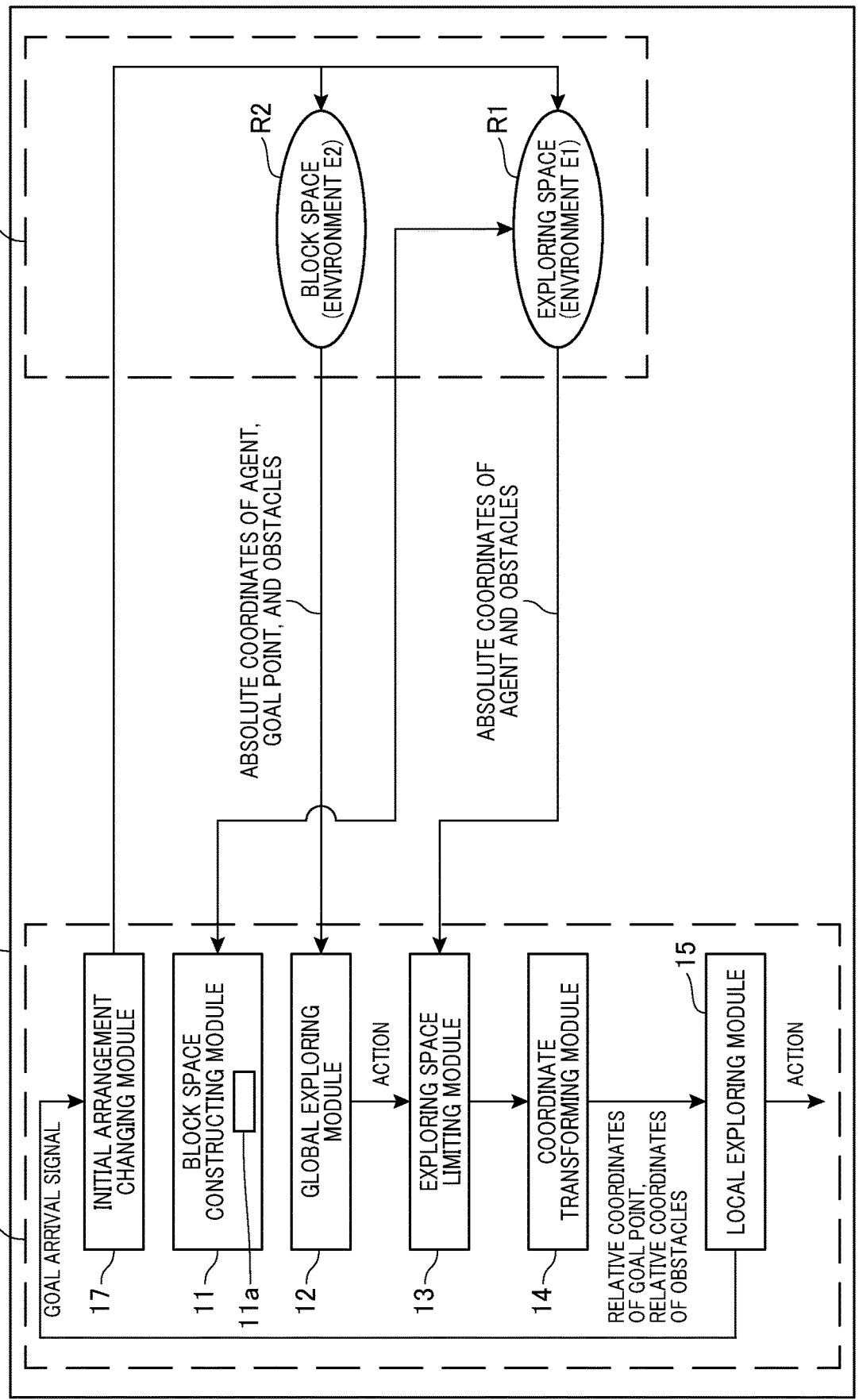
FIG. 19 is a functional diagram of a path exploring system according to the fourth embodiment of the present disclosure.
Figure 22:
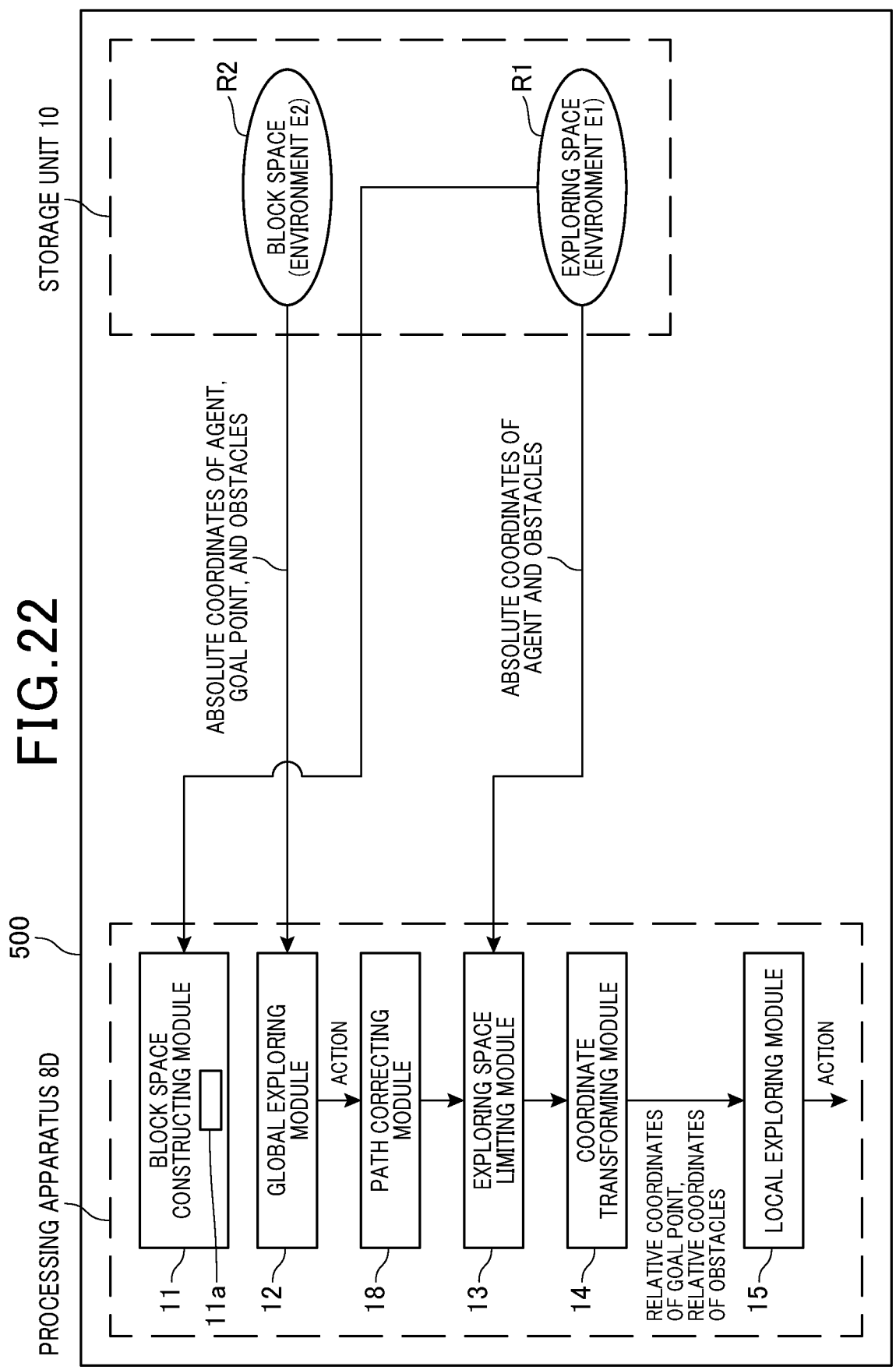
FIG. 22 is a functional diagram of a path exploring system according to the fifth embodiment of the present disclosure.

The following describes the fourth embodiment of the present disclosure with reference to FIGS. 19 to 21. The configuration and functions of a path exploring system 400 according to the fourth embodiment are mainly different from those of the path exploring system 100 according to the first embodiment by the following points. The following therefore mainly describes the different points.

The path exploring system 400 of the fourth embodiment includes a processing apparatus 8C, and the processing apparatus 8C includes an initial arrangement changing module 17 capable of changing the initial point S or the sub initial point S2 on condition that the first agent A or the second agent A2 has succeeded in reaching the sub goal Ga or the sub goal candidate region G2.

First, the following describes the local exploring task by the local exploring module 15. As illustrated in FIG. 20, the processing apparatus 8C of the path exploring system 400 arranges the initial point S of the first agent A at a unit space Ra adjacent to the unit space Ra at which the sub goal Ga is located at a first trial of the local learning.

Then, the processing apparatus 8C serves as the initial arrangement changing module 17 to change the initial point S to another unit space Ra to be farther from the sub goal Ga each time the first agent A has succeeded in reaching the sub goal Ga from the corresponding initial point S as a result of the local exploring task (see second trail, third trial, . . . , N-th trial in FIG. 20). This enables the position of the initial point S to be gradually farther from the sub goal Ga as the first agent A has reached the sub goal Ga from the corresponding initial point S. This configuration therefore enables learning and exploring of an optimal path to be performed while widening a target range of the learning and exploring in the exploring space R1, making it possible for the path exploring system 400 to have a higher level of learning convergence or exploring convergence.

Next, the following describes the global exploring task by the global exploring module 12. As illustrated in FIG. 21, the processing apparatus 8C of the path exploring system 400 arranges the sub initial point S2 of the second agent A2 at a unit block R2a adjacent to the unit block R2a at which the sub goal candidate region G2 is located at a first trial of the global learning.

Then, the processing apparatus 8C serves as the initial arrangement changing module 17 to change the sub initial point S2 to another unit block R2a to be farther from the sub goal candidate region G2 each time the second agent A2 has succeeded in reaching the sub goal candidate region G2 from the corresponding sub initial point S2 as a result of the global exploring task (see second trail, third trial, . . . , N-th trial inn FIG. 21). This enables the position of the sub initial point S2 to be gradually farther from the sub goal candidate region G2 as the second agent A2 has reached the sub goal candidate region G2 from the corresponding sub initial point S2. This configuration therefore enables learning and exploring of an optimal path to be performed while widening a target range of the learning and exploring in the block space R2, making it possible for the path exploring system 400 to have a higher level of learning convergence or exploring convergence.

Fifth Embodiment

The following describes the fifth embodiment of the present disclosure with reference to FIGS. 22 to 25. The configuration and functions of a path exploring system 500 according to the fifth embodiment are mainly different from those of the path exploring system 100 according to the first embodiment by the following points. The following therefore mainly describes the different points.

The path exploring system 500 of the fifth embodiment includes a processing apparatus 8D, and the processing apparatus 8D includes a path correcting module 18 capable of recalculating, after the global exploring task in step S11, a corrected optimal path based on an original optimal path determined by the global exploring task by, for example, eliminating one or more unnecessary or duplicated links included in the original optimal path. Thereafter, the processing apparatus 8D performs the exploring space liming task in steps S12 to S14, the coordinate transforming task in step S15, and the local exploring task in step S16.

Figure 23:
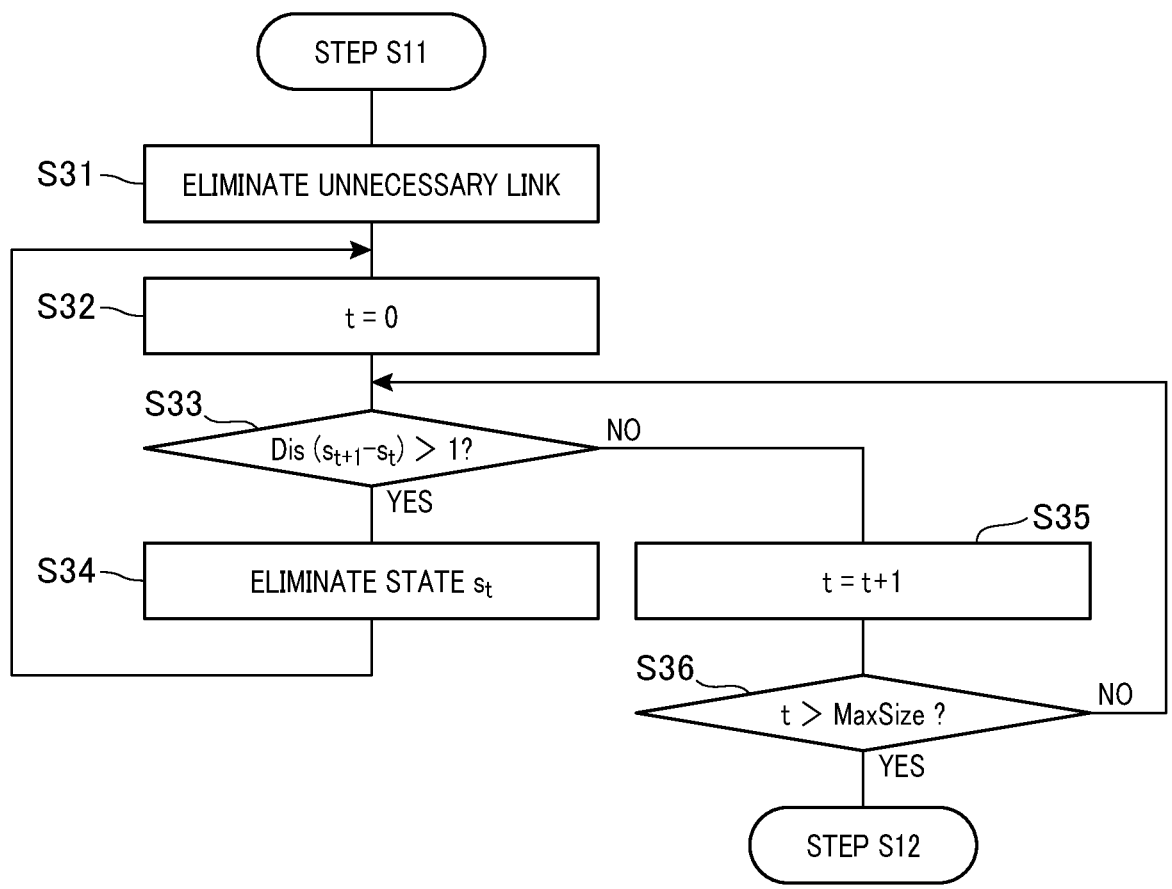
FIG. 23 is a flowchart schematically illustrating a path correcting task according to the fifth embodiment.

Specifically, after the operation in step S11, the processing apparatus 8D serving as the path correcting module 18 eliminates at least one unnecessary or duplicated link in the globally optimal path determined in step S11 in the block space R2 in step S31 of FIG. 23. Next, the processing apparatus 8D serving as the path correcting module 18 sets a variable t to an initial value of 0 in step S32, and determines whether a distance between a selected target state St and the next state St+1 is greater than 1 in step S33.

Upon determination that the distance between the selected target state St and the next state St+1 is greater than 1 (YES in step S33), the processing apparatus 8D serving as the path correcting module 18 eliminates the selected target state St in step S34.

Upon determination that the distance between the selected target state St and the next state St+1 is greater than 1 (YES in step S33), the processing apparatus 8D serving as the path correcting module 18 eliminates the selected target state St in step S34, and thereafter repeats the operations step S32 to S34. Otherwise, upon determination that the distance between the selected target state St and the next state St+1 is smaller than or equal to 1 (NO in step S33), the processing apparatus 8D serving as the path correcting module 18 increments the variable t by 1 in step S35, and thereafter, returns to step S33 and repeats the operations from step S33 until the value of the variable t is greater than a predetermined state number MaxSize (YES in step S36).

That is, the processing apparatus 8D eliminates, from the optimal path from which one or more unnecessary links have been eliminated, a state that changes to a next state by a distance more than 1, and re-establish an optimal path.

Figure 24:
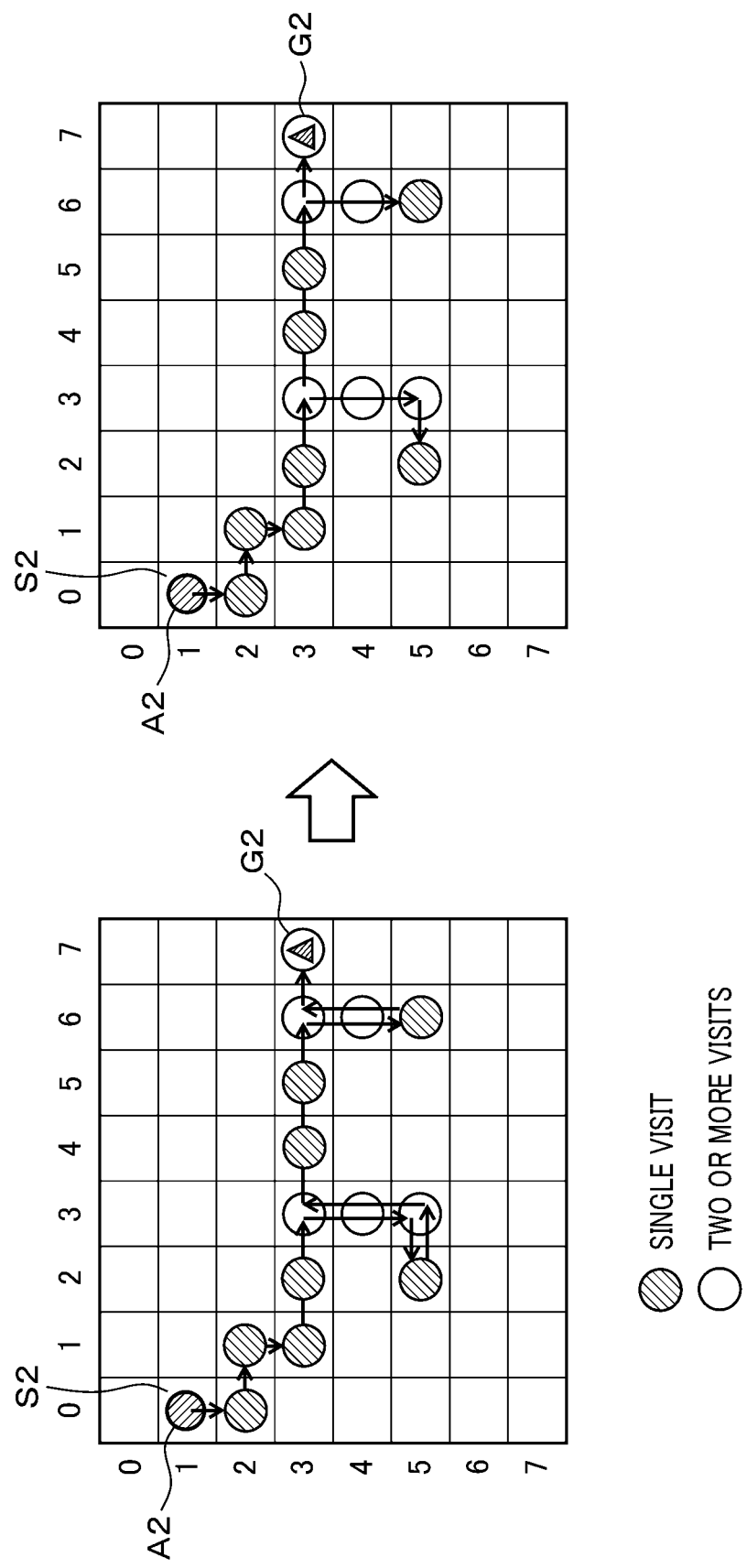
FIG. 24 is a diagram schematically illustrating a first example of an eliminating task according to the fifth embodiment.

The following describes an example of a path correcting task in steps S31 to S36 with reference to FIGS. 24 and 25.

FIG. 24 schematically illustrates the block space R2 comprised of vertically 8 unit-block Ra2 and horizontally 8 unit-spaces Ra2, which is expressed by (8×8) block space R2. If the absolute coordinates (0, 0) to (7, 0) are allocated to the top row of the block space R2, and the absolute coordinates (0, 1) to (7, 1), . . . , and (0, 7) to (7, 7) are respectively allocated to the second row to the seventh row.

Let us consider that the processing apparatus 8D performs the global exploring task to thereby obtain the following globally optimal path OP1 from the sub initial point S2 to the sub goal candidate region G2 via the following states:

OP1=(0, 1)→(0, 2)→(1, 2)→(1, 3)→(2, 3)→(3, 3)→(3, 4)→(3, 5)→(2, 5) [(3, 5)→(3, 4)→(3, 3)] (4, 3)→(5, 3)→(6, 3)→(6, 4)→(6, 5) [(6, 4)→(6, 3)]→(7, 3)

The processing apparatus 8D eliminates unnecessary or duplicated links from the globally optimal path OP1 to thereby reconstruct an optimal path from the sub initial point S2 to the sub goal candidate region G2 in step S31.

Specifically, as illustrated in the left of FIG. 24, the links [(3, 5)→(3, 4)→(3, 3)] are duplicated with the previous links (3, 3)→(3, 4)→(3, 5), and the link [(6, 4)→(6, 3)] is duplicated with the previous link (6, 3) to (6, 4).

Thus, the processing apparatus 8D detects the duplicated links [(3, 5)→(3, 4)→(3, 3)] and [(6, 4)→(6, 3)], and eliminates the duplicated links [(3, 5)→(3, 4)→(3, 3)] and [(6, 4)→(6, 3)] from the globally optimal path OP1 to thereby reconstruct an optimal path OP1A from the sub initial point S2 to the sub goal candidate region G2 in step S31.

The reconstructed optimal path OP1A extends from the sub initial point S2 to the sub goal candidate region G2 via the following states:

OP1A=(0, 1)→(0, 2)→(1, 2)→(1, 3)→(2, 3)→(3, 3)→(3, 4)→(3, 5) [(2, 5)→(4, 3)]→(5, 3)→(6, 3)→(6, 4)→(6, 5)→(7, 3)

Each of the right of FIG. 24 and the left of FIG. 25 schematically illustrates the optimal path OP1A.

Then, the processing apparatus 8D eliminates, from the optimal path OP1A, a state that changes to a next state by a distance more than 1 in steps S32 to S36.

Specifically, the processing apparatus 8D sets the variable t to the initial value of 0 in step S32, checks each adjacent state pair (St→St+1) from the states from (0, 1) to (7, 3), and detects at least one adjacent state pair (St→St+1) whose distance Dis therebetween is larger than 1 in step S33. Then, the processing apparatus 8D eliminates the previous state in the detected at least one adjacent state pair from the optimal path OP1A, thus reconstructing an optimal path OP1B.

That is, because the adjacent state pair [(2, 5)→(4, 3)] has a distance more than 1, the processing apparatus 8D eliminates the previous state (2, 5) in the detected adjacent state pair [(2, 5)→(4, 3)] from the optimal path OP1A, thus reconstructing the optimal path OP1B:

OP1B=(0, 1)→(0, 2)→(1, 2)→(1, 3)→(2, 3)→(3, 3)→(3, 4)→[(3, 5)→(4, 3)]→(5, 3)→(6, 3)→(6, 4)→(6, 5)→(7, 3)

When returning to step S32, and the processing apparatus 8D sets the variable t to the initial value of 0 in step S32, checks each adjacent state pair (St→St+1) from the states from (0, 1) to (7, 3), and detects at least one adjacent state pair (St→St+1) whose distance Dis therebetween is larger than 1 in step S33. Then, the processing apparatus 8D eliminates the previous state in the detected at least one adjacent state pair from the optimal path OP1B, thus reconstructing an optimal path OP1C.

That is, because the adjacent state pair [(3, 5)→(4, 3)] has a distance more than 1, the processing apparatus 8D eliminates the previous state (3, 5) in the detected adjacent state pair [(3, 5)→(4, 3)] from the optimal path OP1B, thus reconstructing the optimal path OP1C:

OP1C=(0, 1)→(0, 2)→(1, 2)→(1, 3)→(2, 3)→(3, 3)→[(3, 4)→(4, 3)]→(5, 3)→(6, 3)→(6, 4)→(6, 5)→(7, 3)

Similarly, when returning to step S32, and the processing apparatus 8D sets the variable t to the initial value of 0 in step S32, checks each adjacent state pair (St→St+1) from the states from (0, 1) to (7, 3), and detects at least one adjacent state pair (St→St+1) whose distance Dis therebetween is larger than 1 in step S33. Then, the processing apparatus 8D eliminates the previous state in the detected at least one adjacent state pair from the optimal path OP1C, thus reconstructing an optimal path OP1D.

That is, because the adjacent state pair [(3, 4) (4, 3)] has a distance more than 1, the processing apparatus 8D eliminates the previous state (3, 4) in the detected adjacent state pair [(3, 4) (4, 3)] from the optimal path OP1C, thus reconstructing the optimal path OP1D:

OP1D=(0, 1)→(0, 2)→(1, 2)→(1, 3)→(2, 3)→(3, 3)→(4, 3)→(5, 3)→(6, 3)→(6, 4)→[(6, 5)→(7, 3)]

Similarly, when returning to step S32, and the processing apparatus 8D sets the variable t to the initial value of 0 in step S32, checks each adjacent state pair (St→St+1) from the states from (0, 1) to (7, 3), and detects at least one adjacent state pair (St→St+1) whose distance Dis therebetween is larger than 1 in step S33. Then, the processing apparatus 8D eliminates the previous state in the detected at least one adjacent state pair from the optimal path OP1D, thus reconstructing an optimal path OP1E.

That is, because the adjacent state pair [(6, 5)→(7, 3)] has a distance more than 1, the processing apparatus 8D eliminates the previous state (6, 5) in the detected adjacent state pair [(6, 5)→(7, 3)] from the optimal path OP1D, thus reconstructing the optimal path OP1E:

OP1E=(0, 1)→(0, 2)→(1, 2)→(1, 3)→(2, 3)→(3, 3)→(4, 3)→(5, 3)→(6, 3)→[(6, 4)→(7, 3)]

Similarly, when returning to step S32, and the processing apparatus 8D sets the variable t to the initial value of 0 in step S32, checks each adjacent state pair (St→St+1) from the states from (0, 1) to (7, 3), and detects at least one adjacent state pair (St→St+1) whose distance Dis therebetween is larger than 1 in step S33. Then, the processing apparatus 8D eliminates the previous state in the detected at least one adjacent state pair from the optimal path OP1E, thus reconstructing an optimal path OP1F.

That is, because the adjacent state pair [(6, 4)→(7, 3)] has a distance more than 1, the processing apparatus 8D eliminates the previous state (6, 5) in the detected adjacent state pair [(6, 4)→(7, 3)] from the optimal path OP1E, thus reconstructing the optimal path OP1F:

OP1F=(0, 1)→(0, 2)→(1, 2)→(1, 3)→(2, 3)→(3, 3)→(4, 3)→(5, 3)→(6, 3)→(7, 3)

At that time, because any adjacent state pair (St→St+1) in the optimal path OP1F does not exceed the distance of 1, the processing apparatus 8D terminates the path correcting task.

This results in the optimal path OP1F from which unnecessary or duplicated links have been eliminated being obtained (see the right of FIG. 25).

As described above, the path exploring system 500 of the fifth embodiment eliminates, from a globally optimal path in the block space R2 obtained by the global exploring task, one or more unnecessary or duplicated links, and also eliminates, from the reconstructed optimal path from which the one or more unnecessary or duplicated links have been eliminated, a state, which has a distance more than 1 to the next adjacent state, thus reconstructing an optimal path. This therefore achieves an optimal path with an excellent level of the solution optimality.

Modifications

The exemplary embodiments of the present disclosure have been described, but the present disclosure is not limited to the above exemplary embodiments, and can be variably modified.

The present disclosure has been applied to the various path exploring systems 100, 200, 300, 400, and 500, but can be applied to various application programs. For example, the present disclosure can be applied to learning of or exploring for an optimal solution of a 2-dimensional maze where N is 2, or to learning of or exploring for an optimal solution of a 3-dimensional labyrinth where N is 3, or learning of or exploring for an optimal motion path of an end effector of a multijoint robot with 6 degrees of freedom (6DoF). The present disclosure can be applied to four or higher-dimensional exploring spaces.

The functions of one element in each embodiment can be distributed as plural elements, and the functions that plural elements have can be combined into one element. At least part of the structure of at least one embodiment can be replaced with a known structure having the same function as the at least part of the structure of the at least one embodiment. A part of the structure of at least one embodiment can be eliminated. All aspects included in the technological ideas specified by the language employed by the claims constitute embodiments of the present disclosure.

The methods, systems, programs, and apparatuses described in the present disclosure can be implemented by a dedicated computer including a memory and a processor programmed to perform one or more functions embodied by one or more computer programs.

The methods, systems, programs, and apparatuses described in the present disclosure can also be implemented by a dedicated computer including a processor comprised of one or more dedicated hardware logic circuits.

The methods, systems, programs, and apparatuses described in the present disclosure can further be implemented by a processor system comprised of a memory, a processor programmed to perform one or more functions embodied by one or more computer programs, and one or more hardware logic circuits.

The one or more programs can be stored in a non-transitory storage medium as instructions to be carried out by a computer or a processor. One or more functions included in each of the image processing apparatuses disclosed in the present disclosure can be implemented by one or more programmed logic circuits, one or more hardwired logic circuits, and/or one or more hardwired-logic and programmable-logic hybrid circuits.

While the illustrative embodiments of the present disclosure have been described herein, the present disclosure is not limited to the embodiments described herein, but includes any and all embodiments having modifications, omissions, combinations (e.g., of aspects across various embodiments), adaptations and/or alternations as would be appreciated by those having ordinary skill in the art based on the present disclosure. The limitations in the claims are to be interpreted broadly based on the language employed in the claims and not limited to examples described in the present specification or during the prosecution of the application, which examples are to be construed as non-exclusive.

What is claimed is:

1. A computer-readable non-transitory storage medium comprising a learning program that causes a processing apparatus to learn a path in an at least two-dimensional exploring space from an initial point to a goal point while avoiding at least one obstacle in the exploring space for movement of an agent from the initial point to the goal point, each of the initial point, the goal point, and the at least one obstacle having corresponding absolute coordinates, the exploring space comprising individual unit spaces segmentized therein, the learning program causing the processing apparatus to carry out:
    a first step of assembling the unit spaces in blocks to thereby construct unit blocks each comprised of corresponding unit spaces;
    a second step of combining the unit blocks with each other to thereby construct a block space;
    a third step of setting a sub initial point and a sub goal candidate region in the block space, the sub initial point corresponding to the initial point, the sub goal candidate region corresponding to the goal point;
    a fourth step of exploring, in the block space, a global path from the sub initial point to the sub goal candidate region for movement of the agent;
    a fifth step of limiting, based on the global path, the exploring space to thereby determine a limited space in the exploring space;
    a sixth step of arranging a sub goal in the limited space in accordance with a position of the goal point;
    a seventh step of transforming the absolute coordinates of each of the at least one obstacle and the sub goal in the limited space into corresponding relative coordinates relative to a position of the agent located in the limited space; and
    an eighth step of exploring, in the limited space, a target path from the initial point to the sub goal, the eighth step comprising:
        a step of determining whether no paths are present from the initial point to the sub goal;
        a step of checking whether exploring of at least one path from the initial point to the sub goal is feasible in the limited space in accordance with a sampling-based algorithm in response to determination that no paths are present from the initial point to the sub goal; and
        a step of updating the block space in response to determination that exploring of at least one path from the initial point to the sub goal is not feasible in the limited space, and
    the second step further comprising:
        a step of determining, when combining the unit blocks with each other, whether to arrange an additional obstacle in at least one of the unit blocks in accordance with a share of the at least one obstacle in a region of the exploring space, the region corresponding to the at least one of the unit blocks,
        the determining step determining whether to arrange the additional obstacle in the at least one of the unit blocks in accordance with a comparison between the share of the at least one obstacle in a region of the exploring space and a variable threshold; and
    a step of:
        setting, as an early-stage value, a value of the threshold during an early stage of the learning of the target path to be higher than a predetermined reference value; and
        gradually decreasing the threshold from the early-stage value each time the block space is updated such that the number of obstacles in the block space gradually increases each time the block space is updated.

2. The computer-readable storage medium according to claim 1, wherein:
    the fourth step performs, as a sampling-based algorithm, the following steps of:
        randomly setting a sampling point in the block space;
        arranging the agent at the sampling point; and
        developing a tree from the sampling point toward the sub goal candidate point to thereby cause the tree to arrive at the sub goal candidate point as the global path; and
    the eighth step performs, as a learning-based algorithm, the following steps of:
        previously learning a function of the target path using a supervised learning algorithm or a reinforcement learning algorithm; and
        exploring, as the target path, an optimal path from initial point to the sub goal in accordance with the learned function.

3. The computer-readable storage medium according to claim 1, wherein:
    the fourth step performs, as a learning-based algorithm, the following steps of:
        previously learning a function of the global path using a supervised learning algorithm or a reinforcement learning algorithm; and
        exploring, as the global path, an optimal path from sub initial point to the sub goal candidate point in accordance with the learned function; and
    the eighth step performs, as a learning-based algorithm, the following steps of:
        previously learning a function of the target path using a supervised learning algorithm or a reinforcement learning algorithm; and
        exploring, as the target path, an optimal path from initial point to the sub goal in accordance with the learned function.

4. The computer-readable storage medium according to claim 1, wherein:
    the sixth step arranges the sub goal at a selected unit space in the limited space such that:
        the at least one obstacle is not located at the selected unit space; and
        the selected unit space is located to be adjacent to the agent located in the limited space.

5. The computer-readable storage medium according to claim 1, wherein:
    the at least one obstacle consists of plural obstacles; and the fifth step regards respective regions of the exploring space located outside of the global path as the obstacles.

6. The computer-readable storage medium according to claim 1, wherein the initial point of the agent is located at a selected unit space in the limited area, the selected unit space being adjacent to the sub goal at an early state of the learning,
the learning program causing the processing apparatus to further carry out:
a step of changing the initial point to be farther from the sub goal each time the agent has succeeded in reaching the sub goal from the initial point in the eighth step.

7. The computer-readable storage medium according to claim 1, wherein the sub initial point of the agent is located at a selected unit block in the block space, the selected unit block being adjacent to the sub goal candidate region at an early state of the learning,
the learning program causing the processing apparatus to further carry out:
a step of changing the sub initial point to be farther from the sub goal candidate region each time the agent has succeeded in reaching the sub goal candidate region from the sub initial point in the eighth step.

8. The computer-readable storage medium according to claim 1, wherein:
the target path comprises a plurality of states, and a plurality of links each located between a corresponding adjacent pair of the states,
the learning program causing the processing apparatus to further carry out:
a step of eliminating, from the target path, duplicated links; and
a step of eliminating, from the target path, one of the states, a length between the one of the states and a next adjacent state thereof in the plurality of states being larger than a predetermined threshold length.

9. A method of learning a path in an at least two-dimensional exploring space from an initial point to a goal point while avoiding at least one obstacle in the exploring space for movement of an agent from the initial point to the goal point, each of the initial point, the goal point, and the at least one obstacle having corresponding absolute coordinates, the exploring space comprising individual unit spaces segmentized therein, the method comprising:
a first step of assembling the unit spaces in blocks to thereby construct unit blocks each comprised of corresponding unit spaces;
a second step of combining the unit blocks with each other to thereby construct a block space;
a third step of setting a sub initial point and a sub goal candidate region in the block space, the sub initial point corresponding to the initial point, the sub goal candidate region corresponding to the goal point;
a fourth step of exploring, in the block space, a global path from the sub initial point to the sub goal candidate region for movement of the agent;
a fifth step of limiting, based on the global path, the exploring space to thereby determine a limited space in the exploring space;
a sixth step of arranging a sub goal in the limited space in accordance with a position of the goal point;
a seventh step of transforming the absolute coordinates of each of the at least one obstacle and the sub goal in the limited space into corresponding relative coordinates relative to a position of the agent located in the limited space; and an eighth step of exploring, in the limited space, a target path from the initial point to the sub goal, the eighth step comprising:
a step of determining whether no paths are present from the initial point to the sub goal;
a step of checking whether exploring of at least one path from the initial point to the sub goal is feasible in the limited space in accordance with a sampling-based algorithm in response to determination that no paths are present from the initial point to the sub goal; and
a step of updating the block space in response to determination that exploring of at least one path from the initial point to the sub goal is not feasible in the limited space, and
the second step further comprising:
a step of determining, when combining the unit blocks with each other, whether to arrange an additional obstacle in at least one of the unit blocks in accordance with a share of the at least one obstacle in a region of the exploring space, the region corresponding to the at least one of the unit blocks,
the determining step determining whether to arrange the additional obstacle in the at least one of the unit blocks in accordance with a comparison between the share of the at least one obstacle in a region of the exploring space and a variable threshold; and
a step of:
setting, as an early-stage value, a value of the threshold during an early stage of the learning of the target path to be higher than a predetermined reference value; and
gradually decreasing the threshold from the early-stage value each time the block space is updated such that the number of obstacles in the block space gradually increases each time the block space is updated.

10. A system for learning a path in an at least two-dimensional exploring space from an initial point to a goal point while avoiding at least one obstacle in the exploring space for movement of an agent from the initial point to the goal point, each of the initial point, the goal point, and the at least one obstacle having corresponding absolute coordinates, the exploring space comprising individual unit spaces segmentized therein, the system comprising:
a memory; and
a processing apparatus communicable with the memory, the processing apparatus being configured to:
assemble the unit spaces in blocks to thereby construct unit blocks each comprised of corresponding unit spaces;
combine the unit blocks with each other to thereby construct a block space;
set a sub initial point and a sub goal candidate region in the block space, the sub initial point corresponding to the initial point, the sub goal candidate region corresponding to the goal point;
explore, in the block space, a global path from the sub initial point to the sub goal candidate region for movement of the agent;
limit, based on the global path, the exploring space to thereby determine a limited space in the exploring space;
arrange a sub goal in the limited space in accordance with a position of the goal point;
transform the absolute coordinates of each of the at least one obstacle and the sub goal in the limited space into corresponding relative coordinates relative to a position of the agent located in the limited space; and explore, in the limited space, a target path from the initial point to the sub goal, wherein to explore the target path from the initial point to the sub goal further comprises:

determining whether no paths are present from the initial point to the sub goal;

checking whether exploring of at least one path from the initial point to the sub goal is feasible in the limited space in accordance with a sampling-based algorithm in response to determination that no paths are present from the initial point to the sub goal; and updating the block space in response to determination that exploring of at least one path from the initial point to the sub goal is not feasible in the limited space, and wherein to combine the unit blocks with each other further comprises:

determining, when combining the unit blocks with each other, whether to arrange an additional obstacle in at least one of the unit blocks in accordance with a share of the at least one obstacle in a region of the exploring space, the region corresponding to the at least one of the unit blocks, wherein whether to arrange the additional obstacle in the at least one of the unit blocks is determined in accordance with a comparison between the share of the at least one obstacle in a region of the exploring space and a variable threshold;

setting, as an early-stage value, a value of the threshold during an early stage of the learning of the target path to be higher than a predetermined reference value; and gradually decreasing the threshold from the early-stage value each time the block space is updated such that the number of obstacles in the block space gradually increases each time the block space is updated.

\* \* \* \* \*